US009667700B2

(12) United States Patent
Feldman et al.

(10) Patent No.: US 9,667,700 B2
(45) Date of Patent: May 30, 2017

(54) RENDERING A REDEEMABLE DOCUMENT

(71) Applicant: Apple Inc., Cupertino, CA (US)

(72) Inventors: Daniel I. Feldman, San Francisco, CA (US); James C. Wilson, Santa Clara, CA (US); Chanaka G. Karunamuni, San Jose, CA (US)

(73) Assignee: Apple Inc., Cupertino, CA (US)

(*) Notice: Subject to any disclaimer, the term of this patent is extended or adjusted under 35 U.S.C. 154(b) by 426 days.

(21) Appl. No.: 13/674,900

(22) Filed: Nov. 12, 2012

(65) Prior Publication Data

US 2014/0047331 A1 Feb. 13, 2014

Related U.S. Application Data

(60) Provisional application No. 61/682,289, filed on Aug. 12, 2012.

(51) Int. Cl.
*G06F 17/21* (2006.01)
*H04L 29/08* (2006.01)
*G06F 17/27* (2006.01)

(52) U.S. Cl.
CPC ............ *H04L 67/10* (2013.01); *G06F 17/212* (2013.01); *G06F 17/2705* (2013.01)

(58) Field of Classification Search
CPC ......... G06F 17/21; G06F 17/212; H04L 29/08
(Continued)

(56) References Cited

U.S. PATENT DOCUMENTS 5,748,780 A * 5/1998 Stolfo ............... G06F 17/30256
382/232
6,804,684 B2 * 10/2004 Stubler et al.
(Continued)

FOREIGN PATENT DOCUMENTS

WO WO 2007059295 A1 * 5/2007 ........... G06Q 20/387

OTHER PUBLICATIONS

Don Tolson, Jun. 17, 2011, http://www.androidthoughts.com/news/show/111497/0/1/5 (SPB Wallet.pdf), pp. 1-5.*
(Continued)

*Primary Examiner* — Scott Baderman
*Assistant Examiner* — Sookil Lee
(74) *Attorney, Agent, or Firm* — Polsinelli LLP

(57) ABSTRACT

Disclosed herein are systems, methods, and non-transitory computer-readable storage media for detecting documents within content received by a computing device. A computing device can receive content through an application. The received content is scanned to determine if it includes a file type indicating that it includes a redeemable document. A notification is presented to the user when a document has been detected within the content including a button enabling rendering of the document on the computing device. The rendered document can include a button to transmit the document to secondary computing devices associated with the user. A user profile associated with the user can include data indicating secondary computing devices associated with the user. The user profile can be accessed to retrieve the data and, if the button is selected, the document can be transmitted to the secondary computing devices from which the user can render the document.

34 Claims, 31 Drawing Sheets

(58) Field of Classification Search
USPC .......................................... 715/273; 709/217
See application file for complete search history.

(56) References Cited

U.S. PATENT DOCUMENTS

| | | | |
|---|---|---|---|
| 7,623,892 B2 | 11/2009 | Hawkins | |
| 7,954,050 B2 | 5/2011 | Maryka et al. | |
| 8,185,839 B2 | 5/2012 | Jalon et al. | |
| 8,219,925 B2 * | 7/2012 | Othmer et al. | 715/774 |
| 8,313,018 B2 * | 11/2012 | Wang et al. | 235/375 |
| 8,527,380 B2 * | 9/2013 | Pitroda | G06Q 20/04 235/379 |
| 8,706,890 B2 * | 4/2014 | Chen et al. | 709/228 |
| 2001/0013052 A1 * | 8/2001 | Benjamin et al. | 709/203 |
| 2002/0010627 A1 * | 1/2002 | Lerat | G06Q 30/02 705/14.26 |
| 2002/0060246 A1 * | 5/2002 | Gobburu et al. | 235/462.46 |
| 2004/0039663 A1 * | 2/2004 | Kernz | 705/27 |
| 2007/0160070 A1 | 7/2007 | Buchhop et al. | |
| 2007/0198560 A1 * | 8/2007 | Foygel et al. | 707/101 |
| 2008/0077488 A1 * | 3/2008 | Main et al. | 705/14 |
| 2008/0115086 A1 * | 5/2008 | Rupp | G06Q 10/10 715/810 |
| 2008/0183576 A1 * | 7/2008 | Kim et al. | 705/14 |
| 2008/0262928 A1 * | 10/2008 | Michaelis | 705/14 |
| 2010/0179857 A1 * | 7/2010 | Kalaboukis et al. | 705/10 |
| 2010/0260426 A1 | 10/2010 | Huang et al. | |
| 2010/0331016 A1 * | 12/2010 | Dutton et al. | 455/456.3 |
| 2011/0047368 A1 * | 2/2011 | Sundaramurthy et al. | 713/100 |
| 2011/0145068 A1 * | 6/2011 | King et al. | 705/14.55 |
| 2011/0154195 A1 | 6/2011 | Kim et al. | |
| 2011/0177799 A1 * | 7/2011 | Ramer et al. | 455/414.1 |
| 2011/0282725 A1 * | 11/2011 | Chatterjee | G06Q 30/02 705/14.24 |
| 2011/0287809 A1 | 11/2011 | Silverbrook et al. | |
| 2012/0117460 A1 | 5/2012 | Sylthe et al. | |
| 2012/0136706 A1 * | 5/2012 | Chang et al. | 705/14.21 |
| 2013/0004076 A1 * | 1/2013 | Koo | G06K 9/228 382/176 |
| 2013/0024223 A1 * | 1/2013 | Thomas | G06Q 20/32 705/5 |
| 2013/0041734 A1 * | 2/2013 | Dean | G06Q 20/322 705/14.23 |
| 2013/0051670 A1 * | 2/2013 | Das et al. | 382/170 |
| 2013/0073388 A1 * | 3/2013 | Heath | 705/14.53 |
| 2013/0124186 A1 * | 5/2013 | Donabedian et al. | 704/2 |
| 2013/0166332 A1 * | 6/2013 | Hammad | G06Q 40/10 705/5 |
| 2013/0191759 A1 * | 7/2013 | Bhogal | G06Q 10/10 715/752 |
| 2013/0268357 A1 * | 10/2013 | Heath | 705/14.53 |
| 2013/0318193 A1 * | 11/2013 | Koli et al. | 709/213 |
| 2013/0325567 A1 * | 12/2013 | Bradley | G06Q 30/02 705/14.1 |
| 2014/0006556 A1 * | 1/2014 | Shapiro et al. | 709/217 |
| 2014/0025519 A1 * | 1/2014 | Thomas | 705/21 |
| 2014/0130035 A1 * | 5/2014 | Desai | G06Q 20/08 717/172 |
| 2014/0365609 A1 * | 12/2014 | Luna | 709/217 |

OTHER PUBLICATIONS

Costello, Sam, "iCloud Frequently Asked Questions", About.Com iPhone/iPod, Jun. 7, 2012, http://ipod.about.com/od/glossary/a/Icloud-Frequently-Asked-Questions.html, 3 pages.

Feldman, Daniel I. et al., "Conversion Management System, Method and Computer Program", International Search Report and Written Opinion, dated Apr. 4, 2014, Application No. PCT/US2013/048331, filed Jun. 27, 2013, Feb. 20, 2014, pp. 1-28.

Rawlinson, Nik, "iCloud: How to use Photo Stream", iCloud: How to use Photo Stream/Reviews/CNET UK, http://reviews.cnet.co.uk/mobile-phones/icloud-how-to-use-photo-stream, Oct. 12, 2011, pp. 1-15.

* cited by examiner

RENDERING A REDEEMABLE DOCUMENT

BACKGROUND

1. Technical Field

The present disclosure relates to redeemable documents received within content and more specifically to detecting redeemable documents within received content and transmitting the redeemable documents to secondary computing devices.

2. Introduction

Loyalty cards, identification cards, coupons, tickets, boarding passes and other redeemable documents are used by people every day when making purchases, proving identity, gaining access to events and when travelling. With the ubiquitous use of mobile computing devices, many of these redeemable documents have been digitized and are stored on mobile computing devices. However, managing and accessing the digitized versions of these redeemable documents on the mobile computing device can be cumbersome and time consuming.

Further, documents such as these are often transmitted to computing devices over a network. The redeemable documents can be embedded within content such as webpages, email, text messages, applications, etc. Embedded redeemable documents can be difficult to detect and manage. Further, users may have a number of computing devices and may not know which device they will be using or have available when they need the received redeemable document. Thus, there exists a need for a method of easily detecting redeemable documents and transmitting them to other computing devices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for detecting redeemable documents within content received by a primary computing device. The primary computing device can receive content through an application such as an email application, web browser application, client application, etc. The received content can be scanned to determine whether it includes a redeemable document. For example, the received content can be scanned for a file or MIME type indicating that the content includes content information defining a redeemable document.

Upon detecting that the content includes a redeemable document, a notification can be presented to the user that a redeemable document has been detected within the content. Further, a button can be presented enabling the user to select to view the content. If a user selects to view the redeemable document, the redeemable document can be rendered on the primary computing device. The redeemable document can be rendered by the primary computing device by analyzing the detected redeemable document information defining the redeemable document.

In addition to rendering the redeemable document, a button can be provided enabling a user to transmit the redeemable document to secondary computing devices associated with the user. For example, a user profile associated with the user can include data indicating secondary computing devices associated with the user. The user profile can be accessed to retrieve the data regarding the secondary computing devices. A button provided with the rendered redeemable document can enable a user to transmit the redeemable document to the secondary computing devices. If the button is selected, the redeemable document can be transmitted to the secondary computing devices from which the user can render the redeemable document.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Overview

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 1:
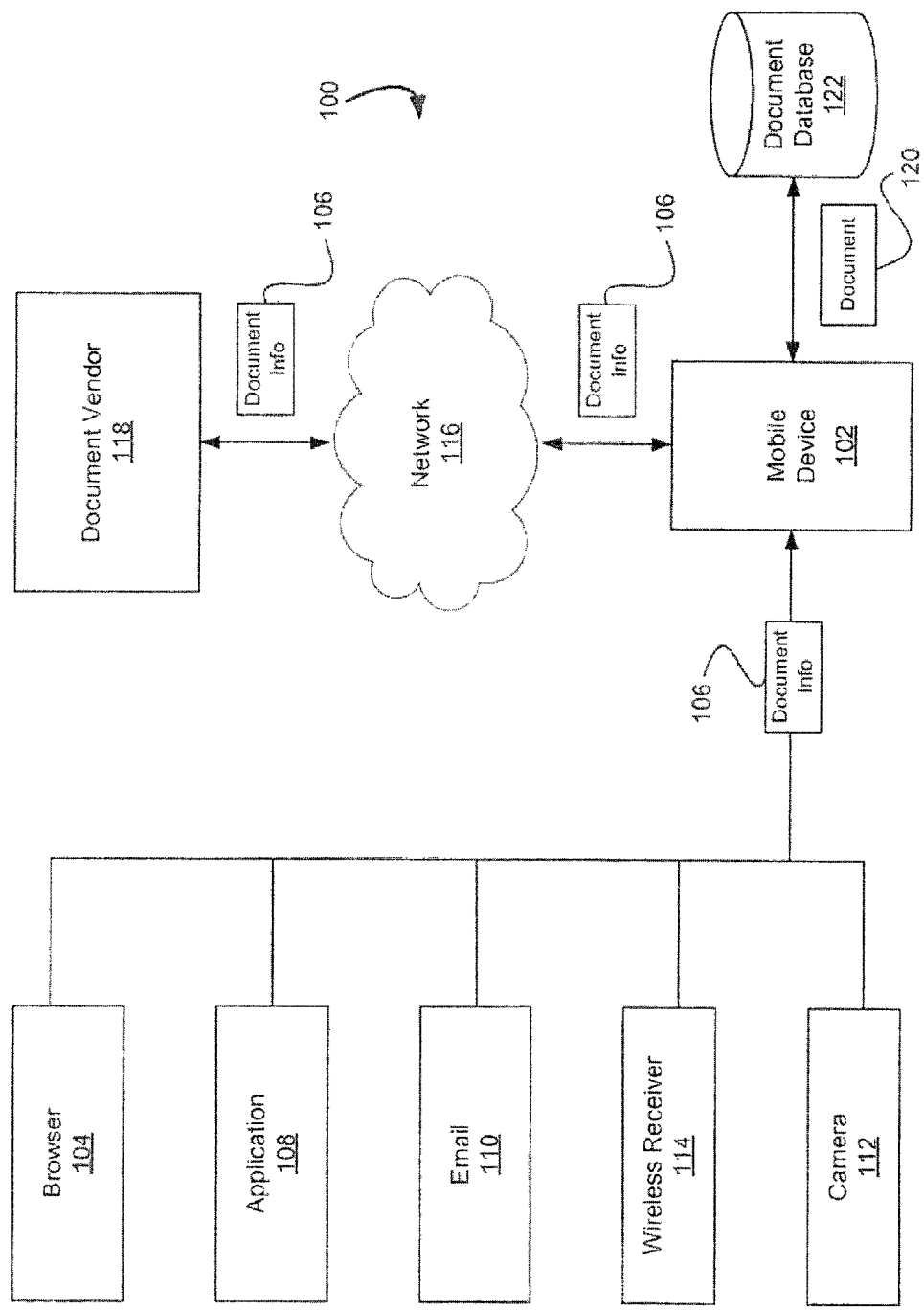
FIG. 1 illustrates an example system for receiving, storing and updating redeemable documents on a mobile device.

FIG. 1 illustrates an example system 100 for receiving, storing and updating redeemable documents on a mobile device. A redeemable document can be any type of document that includes verifiable data that can be used to authenticate the redeemable document. For example, the redeemable documents of system 100 can include verifiable data such as a code to authenticate the redeemable documents. Some example of a redeemable documents include customer loyalty cards, event tickets, vouchers, coupons, boarding passes, identification cards, key cards (e.g., cards to access hotel rooms, houses, cars, etc.) or any other type of redeemable document. In some implementations, system 100 can include mobile device 102. For example, mobile device 102 can be a laptop computer, a smartphone, a feature phone, a tablet computer or any other type of computing device.

In some implementations, mobile device 102 can include applications that a user of mobile device 102 can use to obtain various redeemable documents. For example, mobile device 102 can include browser 104. Browser 104 can be used to access webpages where the user can purchase tickets to an event, boarding passes for travel or other types of redeemable documents. Browser 104 can be used to access webpages where the user can subscribe to customer loyalty programs of various vendors or commercial enterprises. The redeemable document information 106 generated by these transactions can be downloaded or transmitted to mobile device 102 through browser 104. For example, information associated with the purchased ticket, boarding pass or other redeemable documents can be transmitted to mobile device 102 through browser 104. Information associated with a customer loyalty card or account generated by the user's subscription to a customer loyalty program can be transmitted to mobile device 102 through browser 104.

In some implementations, mobile device 102 can include application 108. For example, application 108 can be client application to a network (e.g., Internet) service that allows a user to download redeemable documents. Application 108 can be a client application that allows the user to purchase event tickets and download the event tickets to mobile device 102. Application 108 can be a travel application that allows the user to purchase airplane boarding passes and hotel accommodations. When a user purchases items through application 108, redeemable document information 106 associated with those purchases can be download to mobile device 108 through application 108.

In some implementations, mobile device 102 can include email application 110. For example, instead of receiving redeemable document 106 through browser 104 or application 108, mobile device 102 can receive redeemable document information 106 as an email attachment. For example, browser 104 and/or application 108 may not be configured to allow redeemable document downloads. Thus, if a user purchases a redeemable document using browser 104 or application 108, the online vendor can send to the user an email having redeemable document information 106 attached.

In some implementations, mobile device 102 can include wireless receiver 114. For example, wireless receiver 114 can be configured to receive Wi-Fi signals, Bluetooth signals, near field communication signals or any other type of wireless or radio signals. In some implementations, wireless receiver 114 can receive redeemable document information 106 encoded in a wireless transmission. For example, computing devices can share redeemable document information 106 by encoding redeemable document information 106 into wireless signals and transmitting the wireless signals to other devices. Mobile device 102 can, for example, receive redeemable document information 106 from another computing device.

In some implementations, mobile device 102 can include image capture device 112. For example, image capture device 112 can be a digital camera that is built into mobile device 102. In some implementations, a user can use image capture device 112 to capture redeemable document information 106 encoded on a physical redeemable document. For example, a paper, plastic or other physical redeemable document can have a bar code, quick response code, linear bar codes, matrix codes, or any other type of code that can be optically scanned. The user can capture an image of the paper redeemable document using image capture device 112 and mobile device 102 can determine redeemable document information 106 based on the captured image. For example, an image of the redeemable document can be captured and optical character recognition software can be used to determine redeemable document information 106.

In some implementations, redeemable document information 106 can include all of the information for generating a redeemable document on mobile device 102. For example, redeemable document information 106 can include the user's name, vendor information, user's account identifier and other information for generating a redeemable document on mobile device 102. In some implementations, redeemable document information 106 can include a redeemable document template identifier and data associated with the redeemable document template, as described further below.

In some implementations, only a minimum amount of information is included in redeemable document information 106. For example, the minimum information can include a transaction identifier and a vendor URL (uniform resource locator). Mobile device 102 can use the vendor URL to access a redeemable document vendor server 118 through network 116. Mobile device 102 can transmit redeemable document information 106 to redeemable document vendor server 118. Redeemable document vendor server 118 can use the transaction identification information contained in redeemable document information 106 to identify information associated with a redeemable document and provide the complete redeemable document information to mobile device 102. Once mobile device 102 receives the redeemable document information from vendor server 118, mobile device can generate redeemable document 120 and store redeemable document 120 in redeemable document database 122. For example, based on the redeemable document information received from vendor server 118, mobile device 102 can identify a redeemable document template and populate the redeemable document template with the redeemable document information provided by redeemable document vendor server 118, as described further below.

In some implementations, redeemable document 102 can be stored on a network device. For example, redeemable document database 122 can be a network or cloud-based database. Mobile device 102 can store redeemable document 120 on a network device and access redeemable document 120 as needed from the network device.

New Redeemable Document Interface

Figure 2:
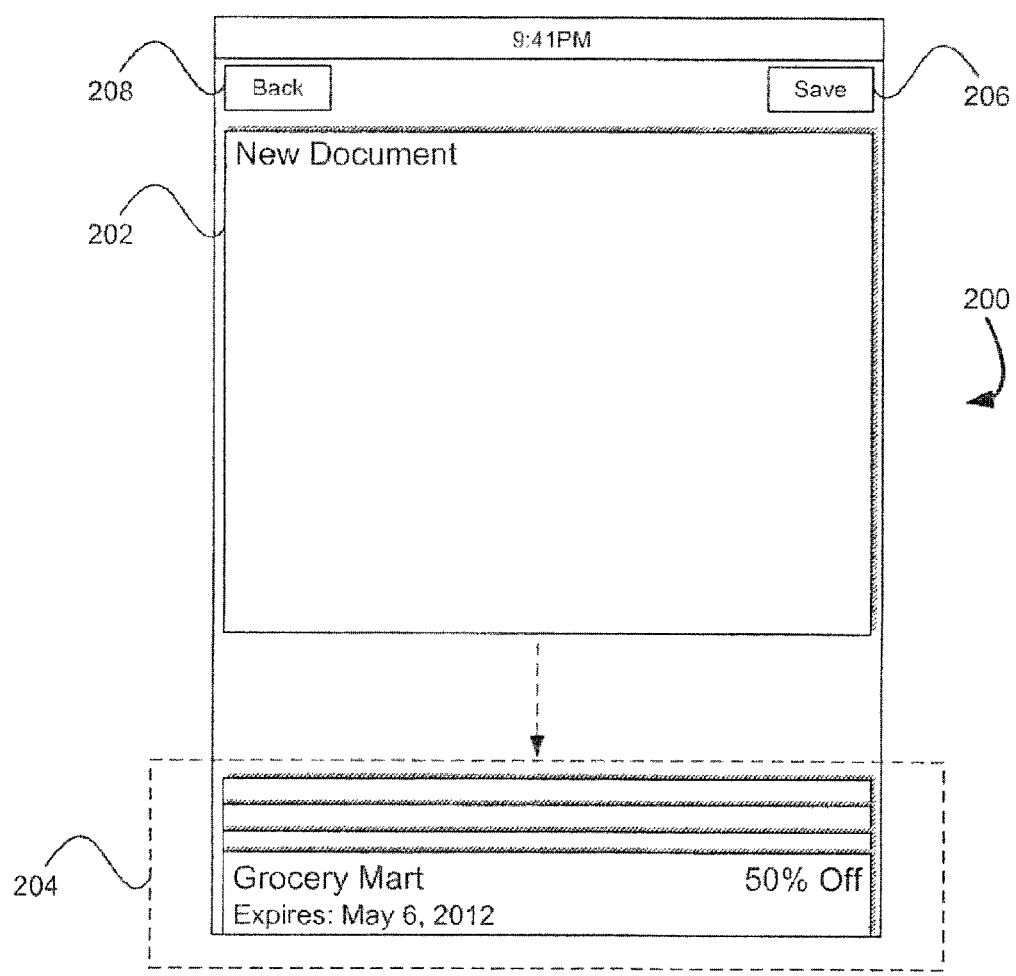
FIG. 2 illustrates an example of a new redeemable document interface.

FIG. 2 illustrates an example of a new redeemable document interface 200. For example, new redeemable document interface 200 can be presented when redeemable document information is received by mobile device 102, as described above. For example, if redeemable document information is received from a website through a browser application, the graphical interface of the browser application can be replaced on the display of the mobile device with new redeemable document interface 200. Similarly, if redeemable document information is received through another application, the displayed application can be replaced on the display of the mobile device with new redeemable document interface 200.

In some implementations, new redeemable document interface 200 can present newly generated redeemable document 202. New redeemable document 202 can correspond to the redeemable document information received at the mobile device and can be generated based on a redeemable document template, described below. New redeemable document 202 can include vendor-provided data specific to the newly generated redeemable document. For example, if new redeemable document 202 corresponds to a boarding pass, new redeemable document 202 can display flight information associated with the boarding pass. If new redeemable document 202 is the only redeemable document currently stored on the mobile device, then new redeemable document 202 can be the only redeemable document displayed on new redeemable document interface 202. If new redeemable document 202 is not the only redeemable document currently stored on the mobile device, then the other redeemable documents currently stored on the mobile device can be presented in an overlapping presentation 204.

In some implementations, an animation can be presented when adding a new redeemable document to redeemable documents stored on the mobile device. For example, to save new redeemable document 202 on the mobile device a user can select graphical element 206. In response to the selection of graphical element 206, redeemable document 202 can be animated to appear to be inserted into the overlapping presentation 204. For example, redeemable document 202 can slide downward across the display of the mobile device until the new redeemable document is inserted into the stack of other redeemable documents on the mobile device. In some implementations, the user can return to the previous application by selecting graphical element 208. In response to the selection of graphical element 208, new redeemable document interface 200 can be replaced on the display of the mobile device by the application that received the new redeemable document. For example, if the user was viewing an email application before new redeemable document interface 200 was displayed, the email application can replace new redeemable document interface 200 on the display when graphical element 208 is selected.

Intelligent Presentation of Redeemable Documents

Figure 3:
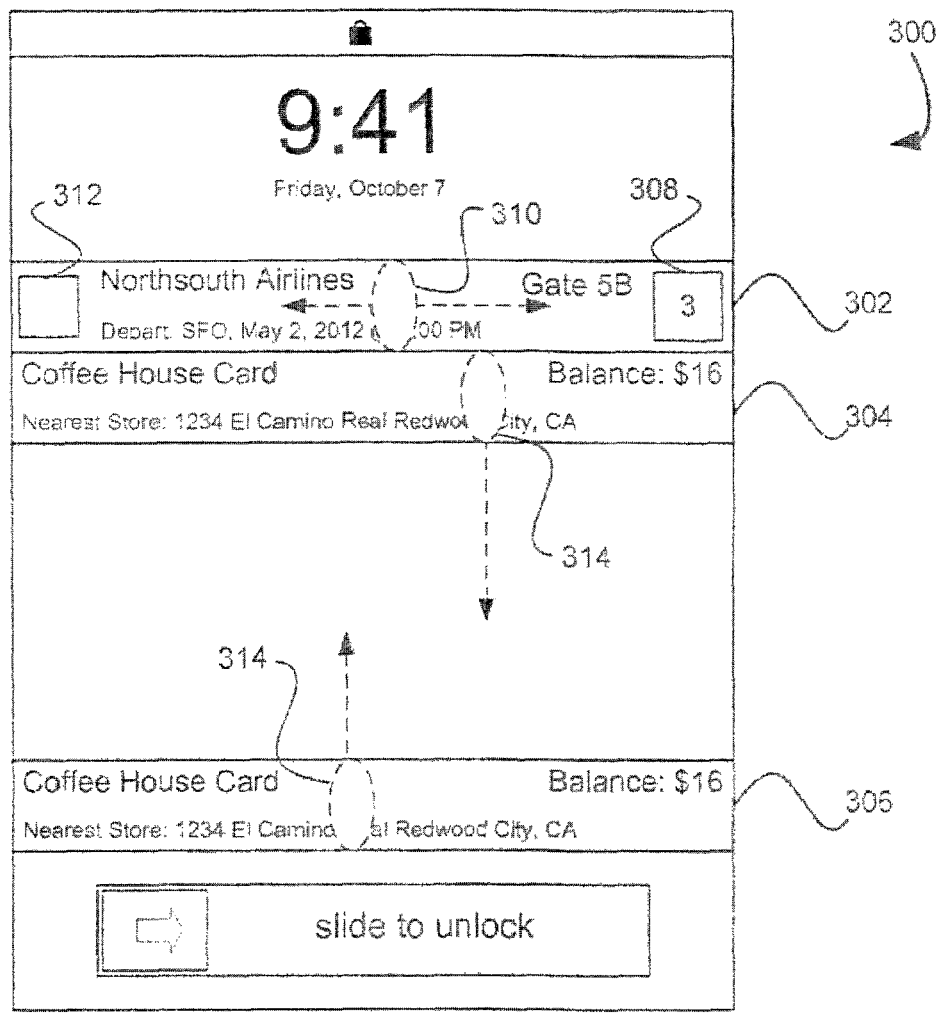
FIG. 3 illustrates an example graphical interface for presenting redeemable documents based on time and/or location.

FIG. 3 illustrates an example graphical interface 300 for presenting redeemable documents based on time and/or location. In some implementations, redeemable documents stored on the mobile device can be associated with a time (e.g., a predetermined date and/or time). Boarding passes for transportation can be associated with a departure and/or boarding time. Event tickets (e.g., concert ticket, movie tickets, etc.) can be associated with an event start time. Sale coupons can be associated with an expiration date. In some implementations, when the current time is close to the predetermined time associated with the redeemable document, the redeemable document can be presented on graphical interface 300 in anticipation of the user's imminent use of the redeemable document. In some implementations, a redeemable document can be associated with a time period or window for presentation of the redeemable document. For example, if the redeemable document is a discount coupon with an expiration date, the discount coupon can be associated with a window of one week in which the discount coupon can be presented on graphical interface 300. The one week window can be a one week period of time prior to and including the expiration date of the discount coupon.

In some implementations, redeemable documents stored on the mobile device can be associated with a location. For example, discount coupons and customer loyalty cards can be associated with a location of a store. Boarding passes can be associated with a location of a transportation hub (e.g., airport, bus terminal, train station, etc.). In some implementations, when the mobile device detects that the current location of the mobile device is proximate to a location associated with a redeemable document, the redeemable document can be displayed. For example, if the mobile device's current location is proximate to a location of a store associated with a loyalty card stored on the mobile device, the loyalty card redeemable document can be displayed on graphical interface 300.

In some implementations, graphical interface 300 can be a lock display of a mobile device. For example, graphical interface 300 can be an interface that is displayed when the mobile device is in a locked state where a password or code is required to access functions of the mobile device. Graphical interface 300 can be the first interface seen by the user when the user wakes the mobile device from a sleep or low power state.

In some implementations, graphical interface 300 can present redeemable document notification 302. For example, redeemable document notification 302 can correspond to an airline boarding pass redeemable document stored on the mobile device. Redeemable document notification 302 can be presented on graphical interface 300 when the mobile device detects that the mobile device is proximate to a location (e.g., the airport) associated with the boarding pass redeemable document and/or a time (e.g., boarding or departure time) associated with the boarding pass redeemable document. Redeemable document notification 302 can present information associated with the boarding pass redeemable document. For example, redeemable document notification 302 can present an abstract or portion (e.g., select items) of information associated with the boarding pass redeemable document. Redeemable document notification 302 can present the name of the airline, a gate number and departure time, for example. Redeemable document notification 302 can indicate how many boarding passes are stored on the mobile device. For example, if a family is travelling together, the boarding passes for each member of the family can be stored on the mobile device. The number of boarding passes for a particular trip can be indicated by graphical element 308, for example.

In some implementations, a user can select redeemable document notification 302 to cause the associated boarding pass redeemable document to be displayed. For example, a user can perform a swipe gesture 310 to cause the boarding pass redeemable document to be displayed. In some implementations, the user can drag graphical element 312 (e.g., redeemable document icon) across redeemable document notification 302 to cause the boarding pass redeemable document to be displayed.

In some implementations, multiple redeemable document notifications can be displayed. For example, redeemable document notification 302 and redeemable document notification 304 can be displayed on graphical interface 300. For example, redeemable document notification 304 can correspond to a customer loyalty card for a coffee house. Redeemable document notification 304 can be displayed when the current location of the mobile device is proximate to an address of the coffee house, for example. Redeemable document notification 304 can present an abstract of information associated with the coffee house customer loyalty card. For example, if the coffee house card can be used to purchase coffee at the coffee house and the card is associated with an account balance (e.g., $16), then the account balance can be displayed on redeemable document notification 304. Redeemable document notification 304 can display the nearest location of the coffee house store, for example.

In some implementations, a user can select redeemable document notification 304 to cause the associated coffee house redeemable document to be displayed on the mobile device. For example, a user can provide touch input 314 and swipe down starting at a location of redeemable document notification on the mobile device. As the user swipes (e.g., pulls) down on the notification, the associated redeemable document can be revealed and/or displayed on the mobile device.

In some implementations, redeemable document notifications can be presented near the bottom of graphical interface 300. For example, redeemable document notification 306 can be presented near the bottom of graphical interface 300. A user can provide touch input 316 (e.g., an upward swipe) to cause the associated redeemable document to be displayed.

In some implementations, redeemable document notifications can be presented in response to receiving a redeemable document information update. For example, when the mobile device receives an update to flight information associated with a boarding pass redeemable document, a redeemable document notification corresponding to the boarding pass redeemable document can be presented on graphical interface 300. The redeemable document notification can present the changed flight information so that the user can be quickly informed of the change. For example, the changed information can be highlighted using colored text or graphical objects (e.g., icons, animations, etc.) that draw the user's attention to the changed information, as described further below.

In some implementations, after a selection of redeemable document notification 302, 304, or 306 is received, the user's identity can be verified and the user can be confirmed to be an authorized user of the mobile device and/or redeemable document associated with the selected redeemable document notification. For example, the user can be prompted for an unlock code or password for the mobile device. The redeemable document associated with the selected notification can be presented after the user enters the correct code or password.

In some implementations, the mobile device can be configured to biometrically verify the identity of the user. In some implementations, the mobile device can be configured to verify the user's identity based on the user's fingerprint. For example, the mobile device scan the user's fingerprint and compare the scanned fingerprint to a previously authenticated fingerprint of an authorized user of the mobile device and/or selected redeemable document. The previously authenticated fingerprint (or biometric data derived from the previously authenticated fingerprint) can be stored on the mobile device or stored on a remote server. The stored fingerprint can be retrieved from the local or remote storage location when the mobile device performs the fingerprint comparison during the user verification process.

In some implementations, the mobile device can be configured to verify the user's identity using facial recognition techniques. For example, the mobile device can be configured with a camera that can capture an image of the user's face when the user selects a redeemable document. The captured image can be compared to a previously authenticated image of the user (or biometric data derived from a previously captured image of the user) to verify the identity of the user who selected the redeemable document. The captured image (or biometric data) can be stored on the mobile device or a remote server and accessed when the mobile device compares the captured image to the previously authenticated image and/or biometric data.

In some implementations, biometric authentication can be performed using sensors (e.g., camera, finger scanner, etc.) configured on the mobile device. In some implementations, biometric authentication can be performed using a touch-sensitive display screen of the mobile device. For example, when the user touches the touchscreen interface of the mobile device, the mobile device can capture the fingerprint of the user.

In some implementations, user authentication/verification using the techniques described above (e.g., password, fingerprint, facial recognition, etc.) can be performed in response to a user selecting a redeemable document notification or in response to a user selecting a redeemable document (e.g., selecting a redeemable document to view). In some implementations, user authentication/verification can be performed when the user attempts to initiate a transaction using a redeemable document stored on the mobile device. For example, if the user attempts to use a redeemable document to make a purchase, the mobile device can scan the user's fingerprint (or face) and verify that the user is an authorized user of the redeemable document before allowing the purchase or presenting (e.g., displaying, transmitting, etc.) information to facilitate the purchase. In some implementations, biometric authentication/verification can be performed passively. For example, as the user makes a redeemable document selection using touch input on a touch screen display, the mobile device can capture the fingerprint of the user. Likewise, the mobile device can capture an image of the user's face as the user makes a selection of a redeemable document. Thus, passive biometric authentication can be performed such that the user does not have to provide authentication-specific input. For example, authentication-specific input can be a user providing a fingerprint as touch input to the mobile device in response to an authentication/verification prompt presented by the mobile device (e.g., where the sole purpose of the touch input is authentication of the user).

Figure 4:
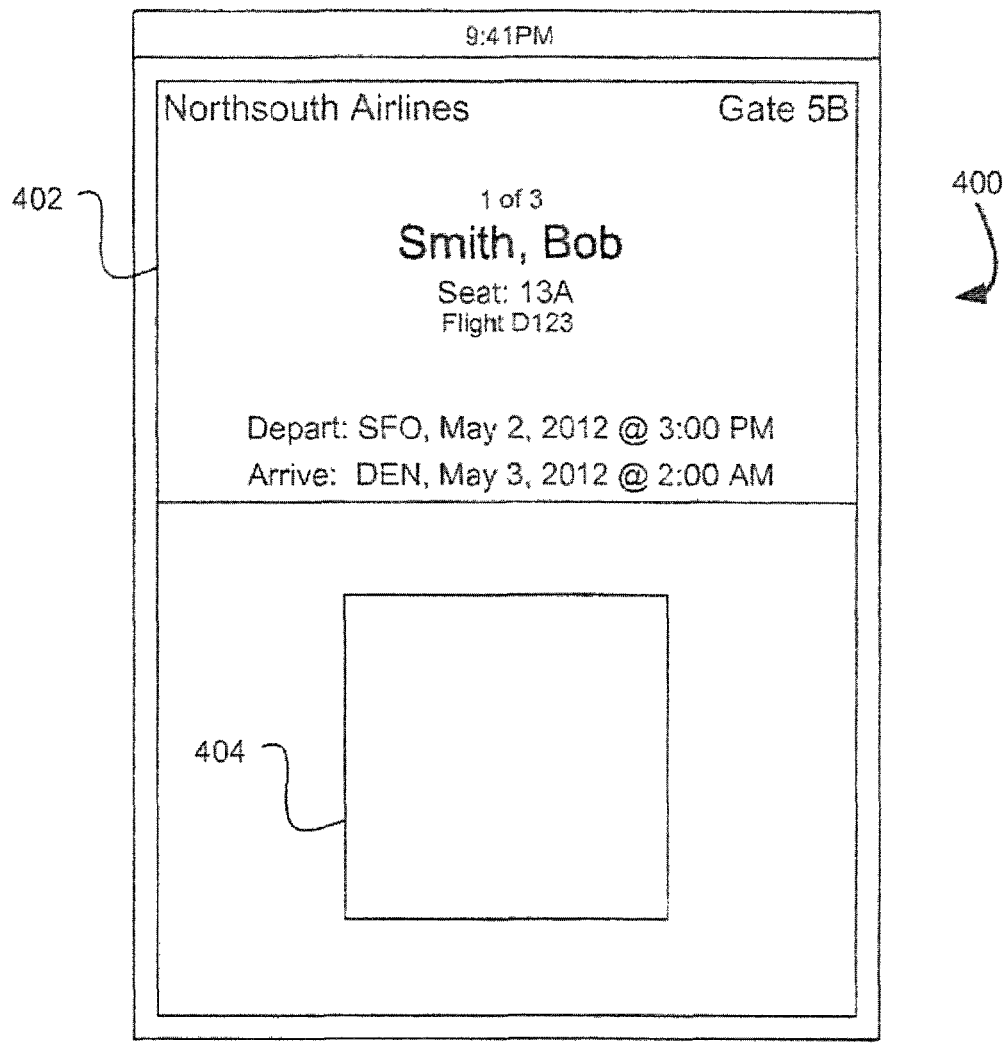
FIG. 4 illustrates an example graphical interface for presenting redeemable document 402 on the mobile device.

FIG. 4 illustrates an example graphical interface 400 for presenting redeemable document 402 on the mobile device. For example, graphical interface 400 can be presented in response to a user selecting redeemable document notification 302 of FIG. 3. Redeemable document 402 can be an airline boarding pass redeemable document, for example. If redeemable document notification 304 or 306 is selected, graphical interface 400 can present a coffee house customer loyalty card redeemable document, for example.

In some implementations, redeemable document 402 can present vendor-provided information associated with redeemable document 402. For example, redeemable document 402 can present airline provided information associated with a boarding pass, including airline name, departure gate, name of passenger, seat number, flight number, departure time, departure location, arrival time, arrival location and any other relevant travel information. In some implementations, if multiple boarding passes associated with the same flight are stored on the mobile device, redeemable document 402 can include an indication of the number of boarding passes (e.g., 1 of 3) stored on the mobile device. If multiple boarding pass redeemable documents exist on the mobile device, the user can provide input (e.g., touch input, swipe gesture) to navigate between the boarding pass redeemable documents.

In some implementations, redeemable document 402 can include an optically scannable and/or machine-readable graphical element 404. For example, graphical element 404 can be a two-dimensional bar code or code matrix that can be scanned by a bar code reader, camera and/or other optical scanning device. When the user uses redeemable document 402 to board an airplane, for example, an airport employee can scan graphical element 404 to process the boarding pass and retrieve information associated with a passenger. In some implementations, near field communications technologies, Bluetooth, and/or other wireless transmission mechanisms can be used to transmit redeemable document information and facilitate transactions between a user and a vendor.

Redeemable Document Management Application

Figure 5:
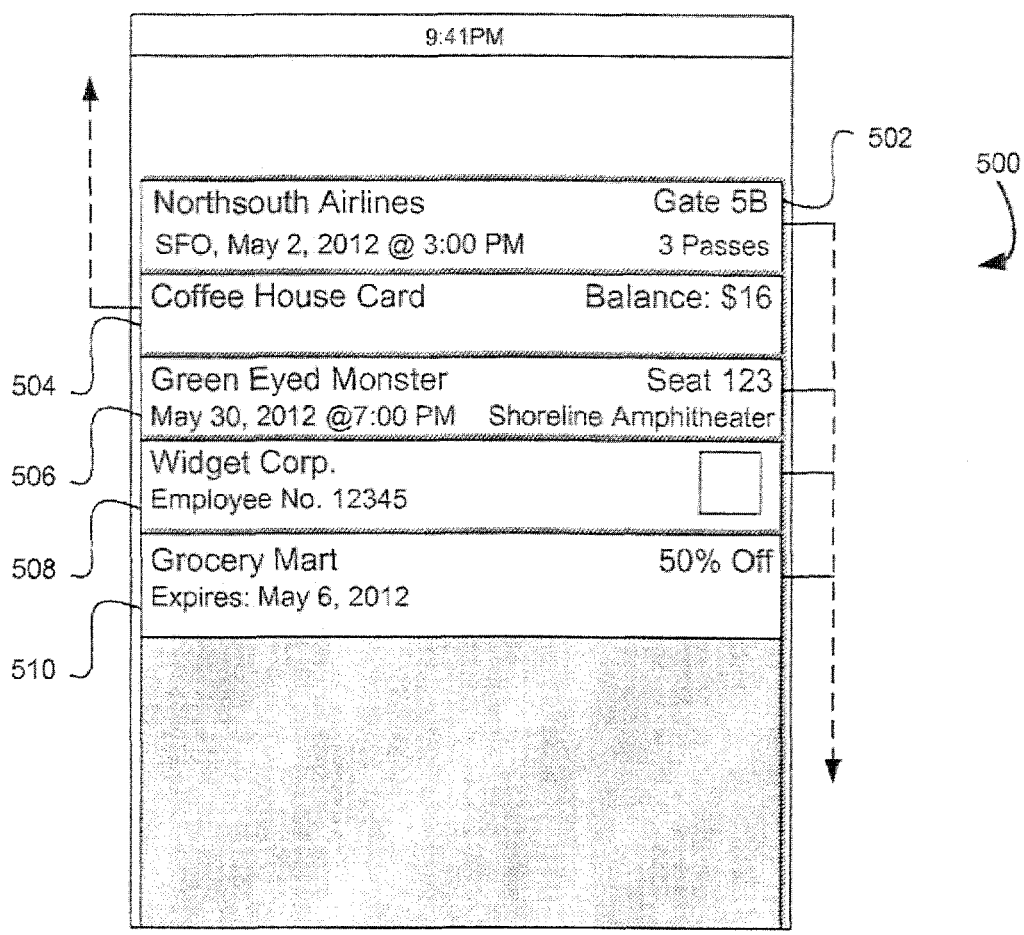
FIG. 5 illustrates an example graphical interface of a redeemable document management application.

FIG. 5 illustrates an example graphical interface 500 of a redeemable document management application. For example, the mobile device can include a redeemable document management application. The user can invoke the redeemable document management application by selecting a graphical element (e.g., an icon) presented on a user interface of the mobile device. Graphical interface 500 can be presented on the display of the mobile device in response to an invocation of the redeemable document management application. In some implementations, if the mobile device is currently storing only one redeemable document, then graphical interface 500 will present the redeemable document in a manner similar to graphical interface 400. If the mobile device is storing two redeemable documents, the redeemable documents can be tiled in graphical interface 500 such that both redeemable documents can be fully viewed.

In some implementations, when three or more redeemable documents are stored on the mobile device, the redeemable documents can be displayed in an overlapping presentation, as illustrated by FIG. 5. For example, when the redeemable documents are displayed in an overlapping presentation, a portion (e.g., top portion) of each redeemable document can be displayed and the portion can present an abstract of the information associated with the redeemable document. For example, the abstract information can include a selection of the most important or useful information associated with each redeemable document. This information can include the name of the redeemable document vendor (e.g., a business associated with the redeemable document), and other information that the user might wish to know by glancing at the displayed portion of the redeemable document. For example, account balances, gate numbers, seat numbers, event locations and times, discount offers and discount amounts can be presented in the displayed portion of the redeemable document so that the user can quickly determine important information about the redeemable document without having to select the redeemable document.

In some implementations, a user can select the displayed portion of the redeemable document to cause a full view of the redeemable document to be displayed. For example, graphical interface 500 can display redeemable document abstracts 502-510. The redeemable document abstracts can include the most important (e.g., most useful) redeemable document information. For example, the redeemable document abstracts can present information that distinguishes one redeemable document from another redeemable document. Redeemable document abstract 502 can correspond to an airline boarding pass redeemable document. Redeemable document abstract 504 can correspond to a customer loyalty card (e.g., purchase card) redeemable document. Redeemable document abstract 506 can correspond to an event ticket (e.g., concert ticket) redeemable document. Redeemable document abstract 508 can correspond to an identification card redeemable document. Redeemable document abstract 510 can correspond to a customer loyalty card redeemable document. A user can select redeemable document abstract (e.g., redeemable document portion) 504 to present a full view of the corresponding customer loyalty card redeemable document.

In some implementations, when a user selects a redeemable document abstract an animation can be presented in conjunction with the presentation of the corresponding redeemable document. For example, when the user selects redeemable document abstract 504, an animation can be presented that causes redeemable document abstract 504 to move upward and the other redeemable document abstracts 502, 506, 508 and 510 to move downward. The movement of the redeemable document abstracts is indicated by the dashed arrows on FIG. 5. As redeemable document abstract 504 moves upward a full view of the corresponding redeemable document can be revealed, as illustrated by FIG. 6.

Other mechanisms/animations can be implemented to present a full view of a redeemable document in response to a selection of a redeemable document abstract. In some implementations, when the user selects a redeemable document abstract the corresponding redeemable document can fade into view while the non-selected redeemable documents fade out of view on the display of the mobile device. In some implementations, the non-selected redeemable documents can slide left or right off of the display to reveal the selected redeemable document. In some implementations, the selected redeemable document abstract can be shuffled to the front (e.g., the position nearest the user) of the presentation of redeemable document abstracts. When the selected redeemable document abstract reaches the front of the of the redeemable document abstracts, the full version of the redeemable document can be displayed.

Figure 6:
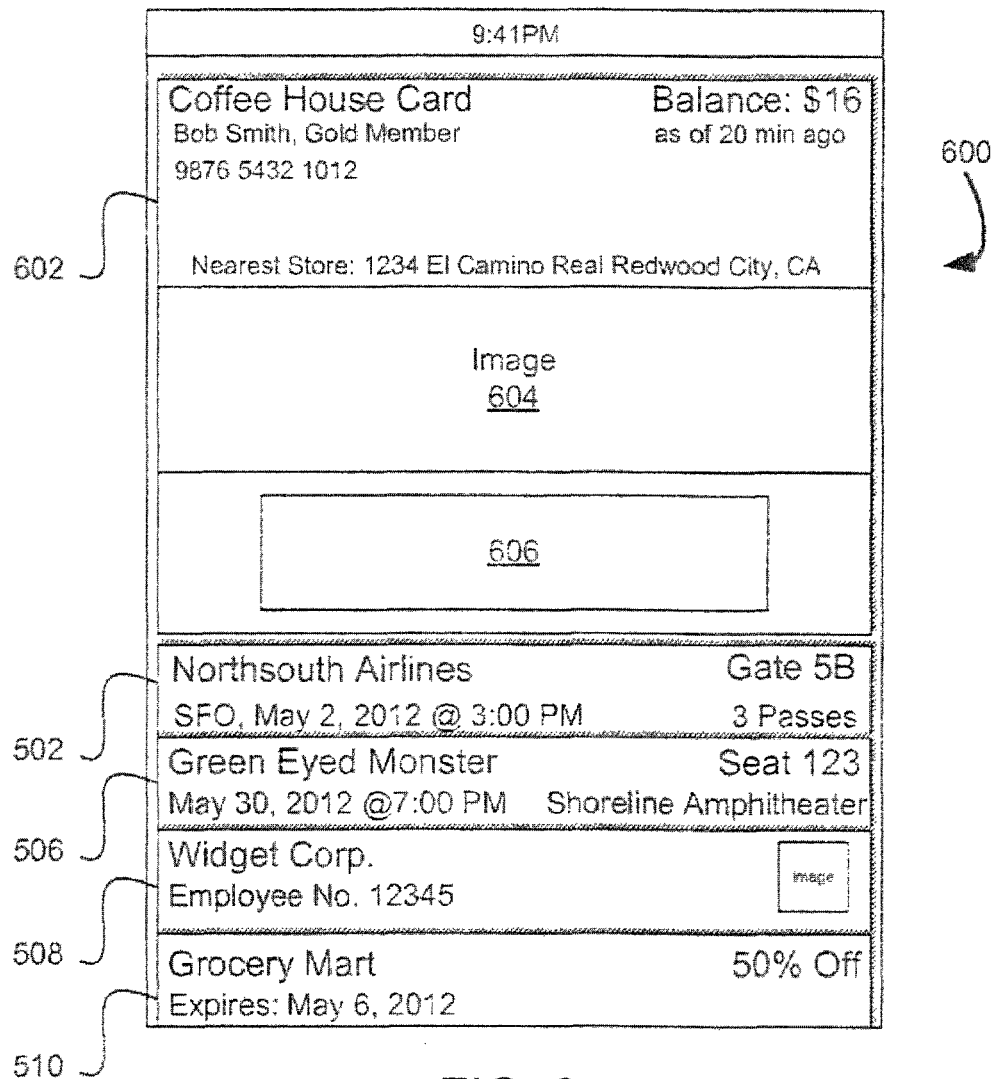
FIG. 6 illustrates an example graphical interface of a redeemable document management application.

FIG. 6 illustrates an example graphical interface 600 of a redeemable document management application. For example, graphical interface 600 can be presented in response to a user selecting redeemable document abstract 504 of FIG. 5. Graphical interface 600 illustrates the result of the animation triggered by the selection of redeemable document abstract 504. For example, the redeemable document abstracts 502, 504, 506 and 508 that were not selected by the user can be moved to the bottom of the display and presented in an overlapping manner. The selected redeemable document abstract 504 can be moved to the top of the display. As the animation is presented a full view of the redeemable document 602 corresponding to the selected redeemable document abstract 504 can be presented. The effect of the animation is to present a simulation of a physical card, file, or folder being pulled out of a stack of cards, a filing cabinet, wallet or other physical storage mechanism.

In some implementations, redeemable document 602 can present a full view of the information associated with the redeemable document. For example, compared redeemable document abstract 504 that merely displays select items of information, redeemable document 602 can present all of the information associated with the redeemable document. Redeemable document 602 can display a name of the redeemable document vendor, an account balance, the name of the redeemable document user/owner, account number, nearest store location, and other information relevant to the user's use of the redeemable document. In some implementations, redeemable document 602 can present an image 604. Image 604 can include an image associated with the redeemable document vendor (e.g., a logo, trademark, etc.). Image 604 can be configured to present additional information, as described in further detail below.

In some implementations, redeemable document 602 can present scannable element 606. For example, element 606 can be a linear bar code, a matrix bar code, a quick response code, scannable text or other optical machine-readable representation of data. Scannable element 606 can be encoded with data associated with redeemable document 602. For example, the encoded data can include a vendor identifier, vendor URL, user account number, a transaction number, or any other information associated with redeemable document 602. Scannable element 606 can be presented to a vendor and scanned by an optical scanning device or image capture device. The scannable element can be decoded to extract the encoded redeemable document information. The encoded redeemable document information can be used to obtain a complete set of information associated with the scanned redeemable document. For example, the vendor URL and account number can be used to contact a vendor server and access account information associated with the scanned redeemable document 602, as described above with reference to FIG. 1. The scannable element 606 can facilitate quick and easy transactions between the user of the mobile device and the redeemable document vendor, for example.

Presenting Related Redeemable Documents

Figure 7:
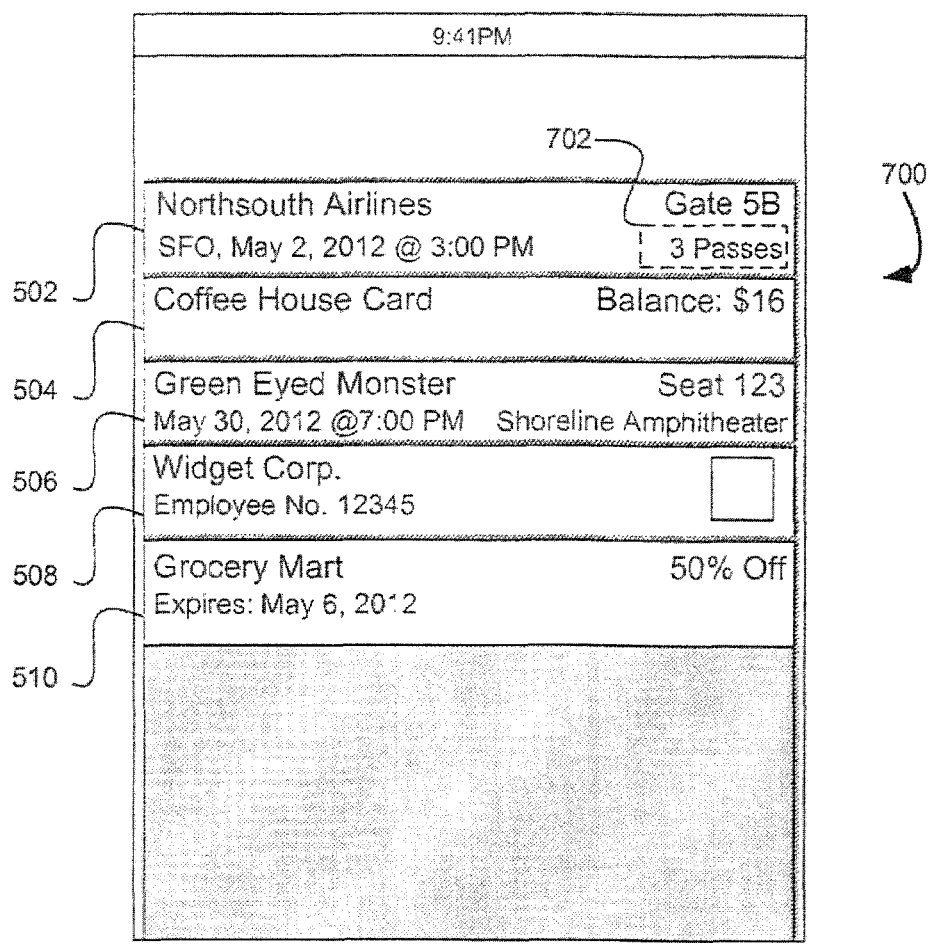
FIG. 7 illustrates an example graphical interface for presenting multiple related redeemable documents.

FIG. 7 illustrates an example graphical interface 700 for presenting multiple related redeemable documents. For example, multiple boarding pass redeemable documents can be related based on flight number, departure location and departure time. Event tickets can be related by event and time. Redeemable documents can be related based on how the redeemable documents were received. For example, redeemable documents that are received as a result of the same transaction, received in the same communication (e.g., email) or received at the same time (or close to the same time) can be identified as related redeemable documents. When a user has multiple related tickets stored on the mobile device, these tickets can be represented on graphical interface 700 by a single redeemable document abstract 502 and an indicator 702 that informs the user that multiple redeemable documents exist that are related to the redeemable document abstract. For example, redeemable document abstract 502 can include text indicating that three boarding passes are available on the mobile device.

Figure 8:
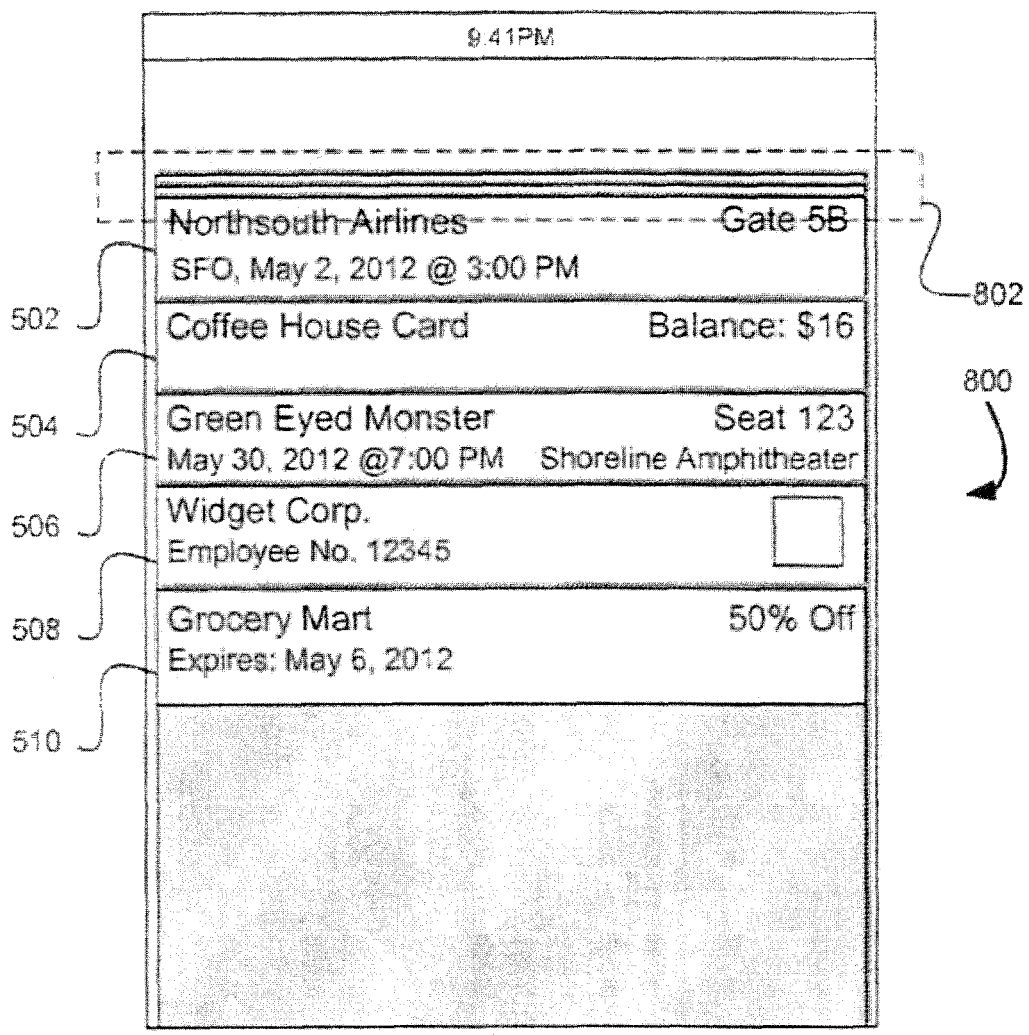
FIG. 8 illustrates an example graphical interface for presenting multiple related redeemable documents.

FIG. 8 illustrates an example graphical interface 800 for presenting multiple related redeemable documents. For example, instead of presenting indicator 703 on redeemable document abstract 502, interface 800 can indicate multiple related redeemable documents by displaying a stacked presentation 802 for the multiple related redeemable documents. The number of items in the stacked presentation can correspond to the number of redeemable documents related to redeemable document abstract 502. Stacked presentation 802 can have the appearance of multiple stacked redeemable documents where the tops of each redeemable document are visible, for example.

Figure 9:
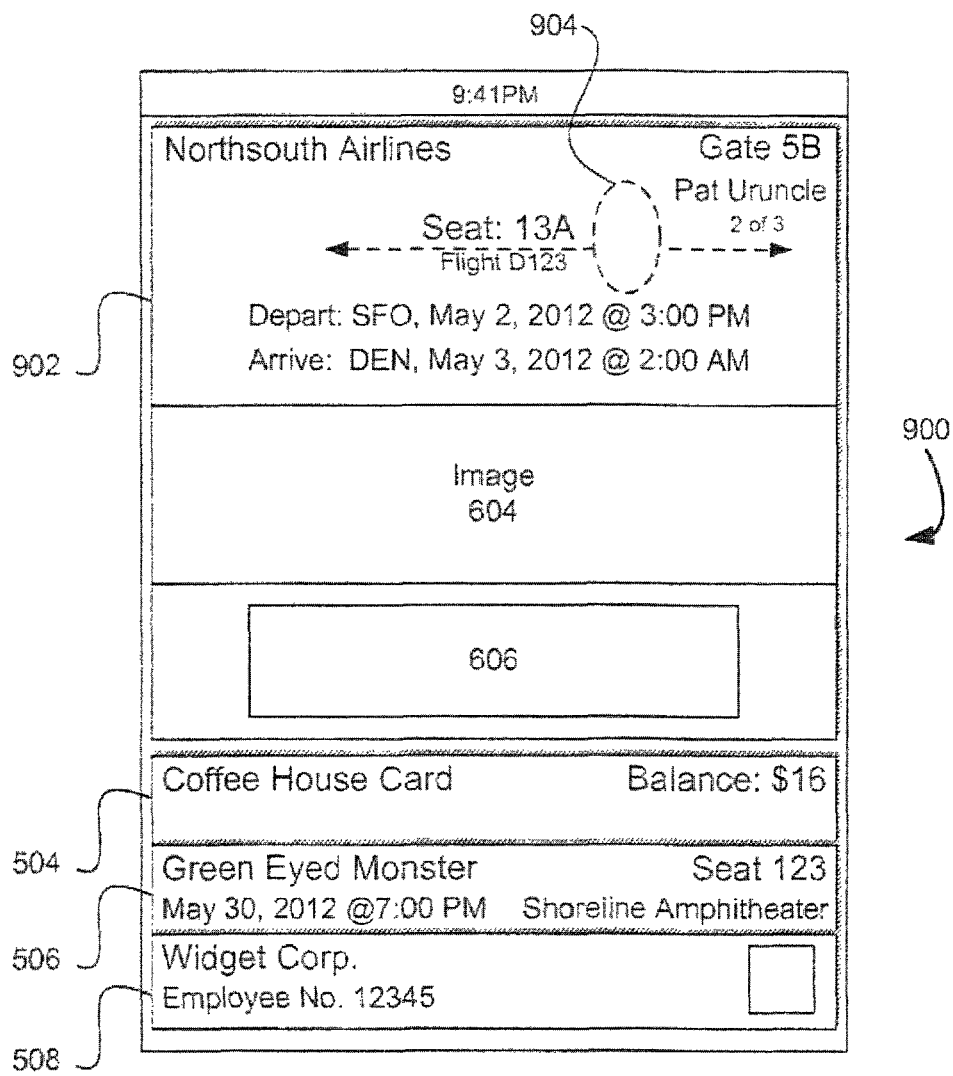
FIG. 9 illustrates an example graphical interface for presenting multiple related redeemable documents.

FIG. 9 illustrates an example graphical interface 900 for presenting multiple related redeemable documents. For example, redeemable document 902 can be one of three related boarding passes. The boarding passes can be related based on flight number, departure time, and/or departure location, for example. In some implementations, only one of the three related redeemable documents is presented at a time. For example, when a user selects abstract 502 of FIG. 7 or FIG. 8, one of the redeemable documents (e.g., redeemable document 902) corresponding to redeemable document abstract 502 can be displayed. In some implementations, a user can provide input to redeemable document 902 to view the next or previous related redeemable document. For example, if there are three related redeemable documents, selection of redeemable document abstract 502 can cause the first (e.g., 1 of 3) redeemable document to be displayed. A user can provide input (e.g., touch input, a tap, or a swipe) to redeemable document 902 to cause the second (e.g., 2 of 3) related redeemable document to be displayed. A user can provide additional input to cause the third (e.g., 3 of 3) related redeemable document to be displayed. For example, the user can provide touch input 904 in the form of a left swipe (e.g., to show previous redeemable document) or a right swipe (e.g., to show next redeemable document) to navigate between the related redeemable documents.

Figure 10:
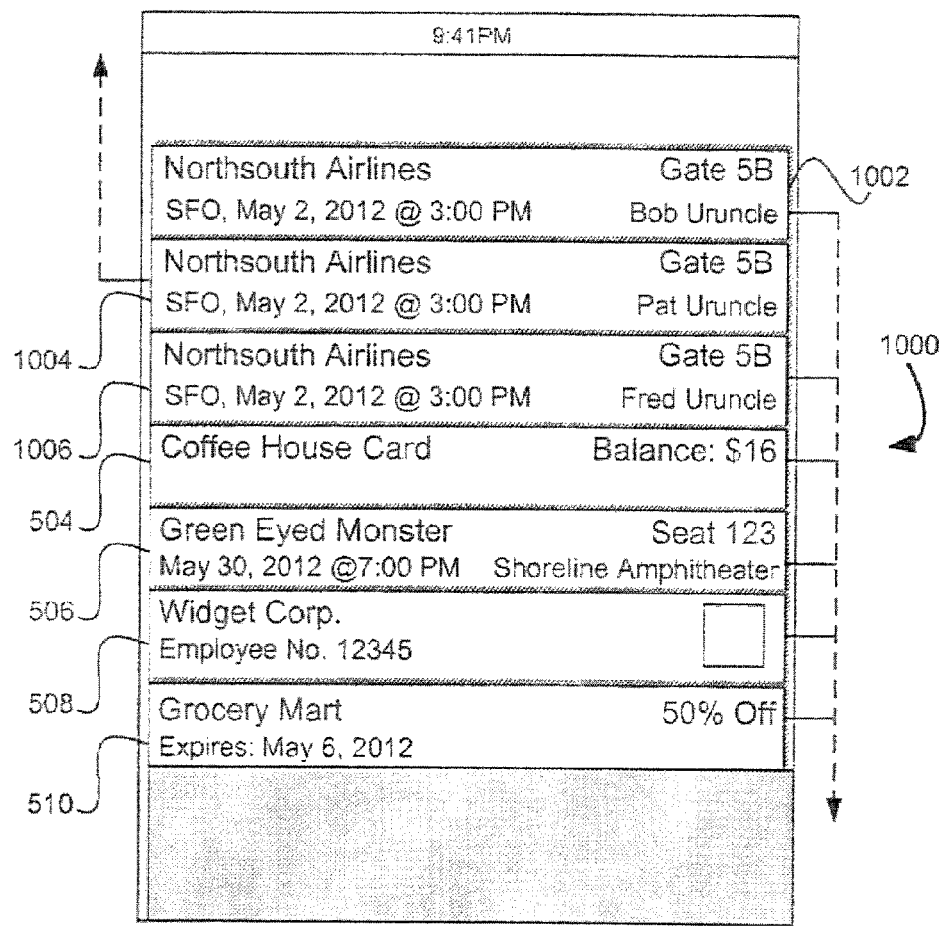
FIG. 10 illustrates an example graphical interface for presenting multiple related redeemable documents.

FIG. 10 illustrates an example graphical interface 1000 for presenting multiple related redeemable documents. In some implementations, redeemable document abstracts for related redeemable documents can be grouped on graphical interface 1000. For example, redeemable document abstracts 1002, 1004 and 1006 can correspond to boarding pass redeemable documents for the same flight. Instead of providing a single redeemable document abstract and providing a multiple redeemable document indicator as in FIG. 7 or displaying an overlapping presentation as in FIG. 8, related redeemable document abstracts 1002, 1004 and 1006 can be displayed independently and grouped together on graphical interface 1000. In some implementations, when multiple related redeemable documents abstracts are displayed, the mobile device can automatically determine a distinguishing characteristic (e.g., the most important difference) for each of the related redeemable documents to be displayed on the redeemable document abstract. For example, each boarding pass is associated with a different passenger. Thus, the passenger name for each boarding pass can be presented on the corresponding redeemable document abstract to aid the user in distinguishing between the related redeemable document abstracts 1002, 1004 and 1006. To view a corresponding redeemable document, a user can select redeemable document abstract 1002, 1004 or 1006 to display the corresponding redeemable document. In this case, selection of redeemable document abstract 1002, 1004 or 1006 will cause the corresponding boarding pass redeemable document to be displayed.

In some implementations, when a user selects one of the grouped redeemable document abstracts 1002, 1004 or 1006, an animation can be presented to reveal the selected redeemable document. For example, the animation can be similar to the animation described with reference to FIG. 5. If the user selects redeemable document abstract 1004, redeemable document abstract 1004 can move toward the top of the display. The unselected redeemable document abstracts 1002, 1006, 504, 506, 508 and 510 can move toward the bottom of the display. The dashed arrows of FIG. 10 indicate the movement of the redeemable document abstracts. As the animation (e.g., movement of the redeemable document abstracts) is occurring, a full view of the redeemable document corresponding to redeemable document abstract 1004 can be revealed, as illustrated by FIG. 11.

Figure 11:
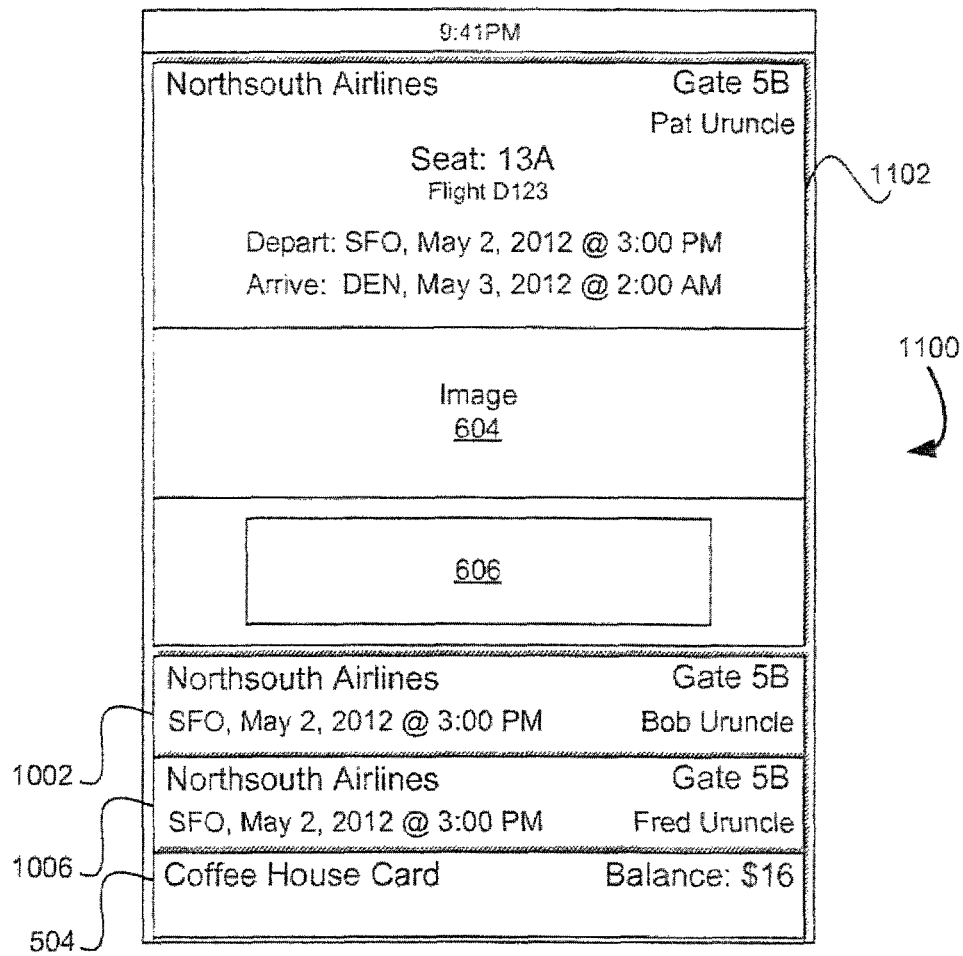
FIG. 11 illustrates an example graphical interface for presenting a selected redeemable document.

FIG. 11 illustrates an example graphical interface 1100 for presenting a selected redeemable document. For example, graphical interface 1100 can be presented in response to the selection of redeemable document abstract 1004. Redeemable document 1102 can correspond to selected redeemable document abstract 1004 of FIG. 10. The unselected redeemable document abstracts 1002, 1006 and 504 can be displayed in an overlapping presentation at the bottom of graphical interface 1100. If the user wishes to view the other redeemable documents that are related to redeemable document 1102 (e.g., redeemable documents corresponding to redeemable document abstracts 1002 and 1006), the user can provide input selecting redeemable document abstract 1002 or 1006 on graphical interface 1100. In response to the selection of redeemable document abstract 1002 or 1006, the corresponding redeemable document can be displayed on graphical interface 1100 in a similar manner as redeemable document 1102.

In some implementations, selection of redeemable document abstract 1002, 1006 or 504 can cause an animation to be presented on graphical interface 1100. For example, if redeemable document abstract 1006 is selected, redeemable document 1102 can be animated to move downward and into the overlapping presentation of redeemable document abstracts 1002, 1006 and 504 until only an redeemable document abstract (e.g., redeemable document abstract 1004) of redeemable document 1102 is visible. Redeemable document abstract 1006 can move upward to reveal the redeemable document corresponding to redeemable document abstract 1006 until a full view of the corresponding redeemable document is displayed similar to redeemable document 1102. Thus, the animation can appear as if the two redeemable documents switch or swap places on graphical interface 1100.

Redeemable Document Templates

In some implementations, redeemable documents can be presented on the display of the mobile device according to predefined redeemable document templates. For example, a redeemable document template can specify the appearance of the redeemable document and the location and type of information displayed on the redeemable document. Redeemable document templates can specify the look and feel of redeemable documents for portrait and/or landscape orientations. For example, a redeemable document can have a different layout in portrait orientation than landscape orientation. Different types of redeemable documents can be associated with different redeemable document templates having different appearances that allow a user to quickly identify a type of redeemable document presented on the display of the mobile device based on its appearance. When redeemable document information is received from a redeemable document vendor, the information can include information that identifies a redeemable document template to be used to generate a redeemable document on the mobile device. The redeemable document template can be identified by a template identifier or by redeemable document type data included in the vendor-provided redeemable document information. The redeemable document templates can determine the look and feel of the redeemable documents presented on the graphical interfaces discussed above in FIGS. 1-11.

In some implementations, the vendor-provided redeemable document information can include data to be presented on the redeemable document, color schemes, images and other information for generating a redeemable document on the mobile device. For example, each redeemable document template can include data fields that can be populated by vendor provided data. In some implementations, the vendor can dynamically update the data for a redeemable document. For example, when account information (e.g., account balance), flight information (e.g., flight number, departure time, boarding time, etc.) or event data (e.g., time, date or venue)

changes the corresponding redeemable document stored on the mobile device can be updated to reflect the changed information.

In some implementations, redeemable documents and/or redeemable document templates can be configured to present information that is provided by other network (e.g., Internet) resources. For example, a boarding pass redeemable document template can include data fields for departure location and destination location. The boarding pass redeemable document template can be configured to display weather, traffic or other information associated with the departure location and destination location, as described below. In some implementations, a user can select location information (e.g., select the text describing the location) displayed on a redeemable document and/or redeemable document template to invoke a map display corresponding to the selected location.

In some implementations, similar redeemable documents can be automatically modified to present distinguishing characteristics to enable the user to distinguish between the redeemable documents. For example, if the user has two or more customer loyalty cards from the same vendor, the customer loyalty card redeemable documents can be automatically provisioned with different colors, images, or other features that the user can use to distinguish the customer loyalty cards. In some implementations, redeemable documents can be automatically updated to present seasonal or holiday themes. For example, redeemable documents can be automatically updated to present images of fireworks, U.S. flags or other images during the time around the Fourth of July.

In some implementations, redeemable documents and/or redeemable document templates can be configured to present optical scannable objects to facilitation transactions between a user and a vendor. For example, a redeemable document can include a linear bar code, a two-dimensional matrix bar code, a quick response code, scannable text or other scannable graphic. The optical scannable object can be encoded with redeemable document information that can be decoded by an optical scanner. The decoded information can then be used to facilitate transactions between the user and the vendor. For example, the decoded information can include ticket information, account information, user identification information, flight information or any other information needed for performing a particular transaction.

In some implementations, redeemable documents and/or redeemable document templates can be configured to cause redeemable document information to be wirelessly transmitted between the user device and a vendor system. For example, near field communications technologies, Bluetooth and/or other wireless transmission technologies can be used to transmit redeemable document information from a user device to a vendor system to facilitate transactions between the user and vendor.

Figure 12:
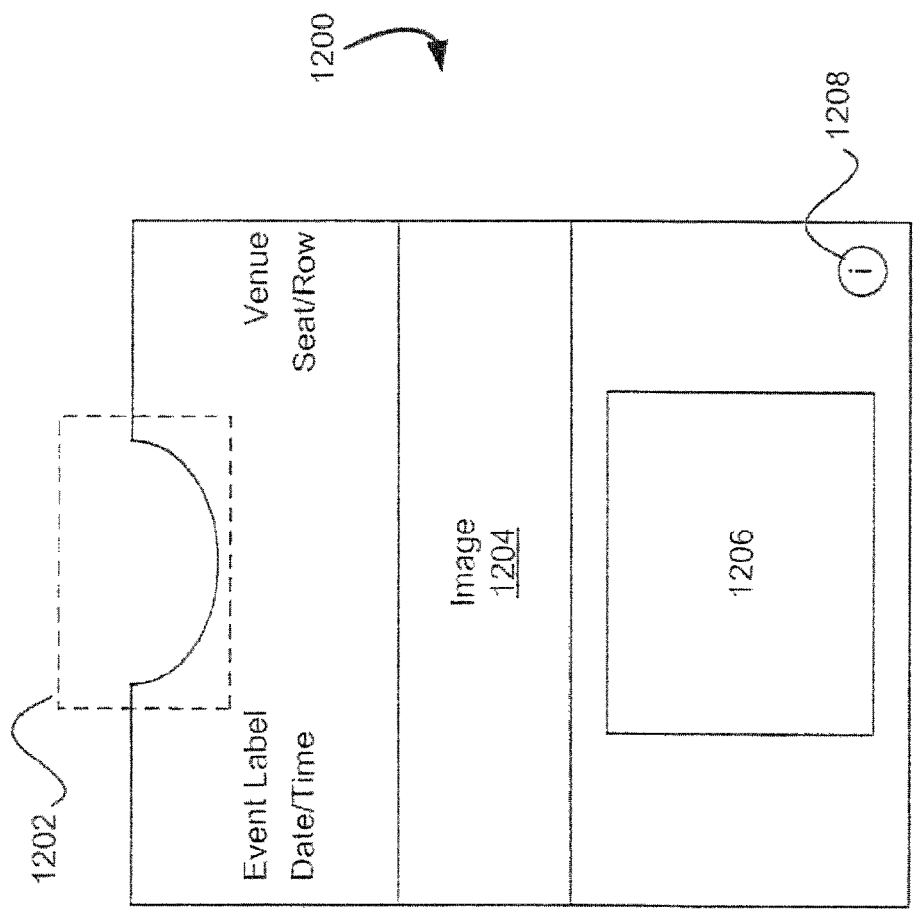
FIG. 12 illustrates an example event ticket template.

FIG. 12 illustrates an example event ticket template 1200. In some implementations, event ticket template can specify the appearance of an event ticket redeemable document. For example, an event ticket redeemable document can correspond to a movie ticket, concert ticket or a ticket for gaining entry to any other type of event. The appearance of the event ticket template can include a cutout 1202 at the top of the redeemable document, for example. The data fields displayed on the event ticket template can include the name of the event, name of the promoter or vendor, the venue, location, date and time of the event. If seating is assigned, the event ticket can specify seat information. Event ticket template 1200 can include an area for presenting image 1204. For example, image 1204 can display an image associated with the event or an image associated with the vendor or promoter. Event ticket 1200 can include scannable object 1206. For example, scannable object 1206 can be an optical machine-readable graphic encoded with redeemable document information, as described above. Event ticket template 1200 can include graphical element 1208 for presenting configuration options. For example, a user can select graphical element 1208 to present graphical interface 1800 of FIG. 18.

Figure 13:
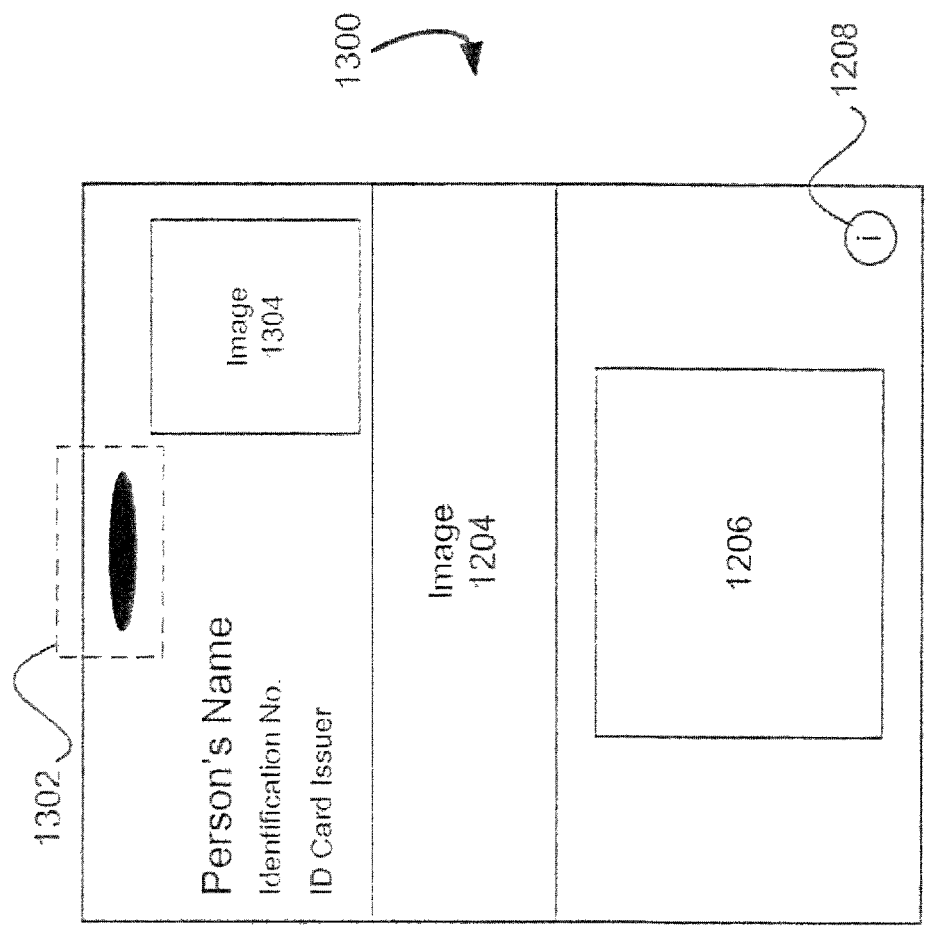
FIG. 13 illustrates an example identification card template.

FIG. 13 illustrates an example identification card template 1300. In some implementations, identification card template 1300 can be visually distinguishable from other redeemable documents by the inclusion of graphical element 1302. For example, graphical element 1302 can have the appearance of a hole near the top of the identification card redeemable document so that the identification card redeemable document resembles a physical identification card (e.g., employee identification card) that a person might wear around their neck or attached to their clothing. Identification card template 1300 can include data fields for presenting a person's name, identification number and identification card issuer (e.g., employer, government entity, etc.). Identification card template 1300 can include image 1304 associated with the person associated with the identification card redeemable document. For example, image 1304 can be a picture of the person's face.

Figure 14:
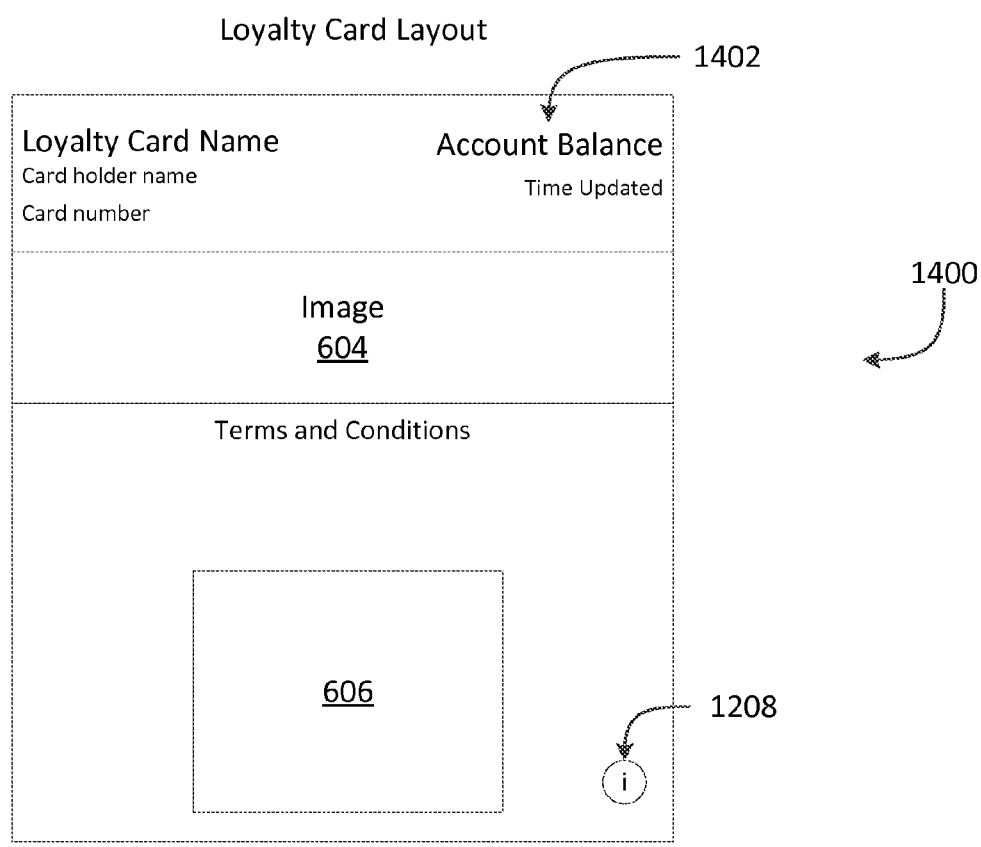
FIG. 14 illustrates an example customer loyalty card template.

FIG. 14 illustrates an example customer loyalty card template 1400. For example, customer loyalty card template can include a vendor/store name, a customer name, customer identification number and/or the nearest store location. In some implementations, the customer loyalty card can function as a store credit card or store purchase card. For example, a customer can transfer money to an account associated with the store purchase card and use the money to purchase items at a store associated with the card. In some implementations, customer loyalty card template 1400 can include an account balance data field 1402. For example, account balance field 1402 can display an account balance (e.g., funds available) for a store credit card or store purchase card. In some implementations, the account balance displayed on a customer loyalty card can be updated dynamically. For example, as the user spends money, adds funds to the account or makes payments to the account associated with the customer loyalty card, the balance displayed in the account balance field can be updated.

For example, a vendor's server can notify the user's mobile device that a change associated with the user's account has occurred, the mobile device can request a data update in response to the change notification, and the data presented on the customer loyalty card can be updated to reflect the changed information. In some implementations, updated or recently changed information can be highlighted by presenting the information using a text color (e.g., red) that is different than the text colors (e.g., black) used for other data displayed on the customer loyalty card redeemable document. In some implementations, updated or recently changed information can be highlighted by presenting a graphical element (not shown) indicating that the information has changed. For example, changed information or data can be highlighted by encircling the changed information with a line or presenting an icon or other graphical element that draws the user's attention to the changed information.

Figure 15:
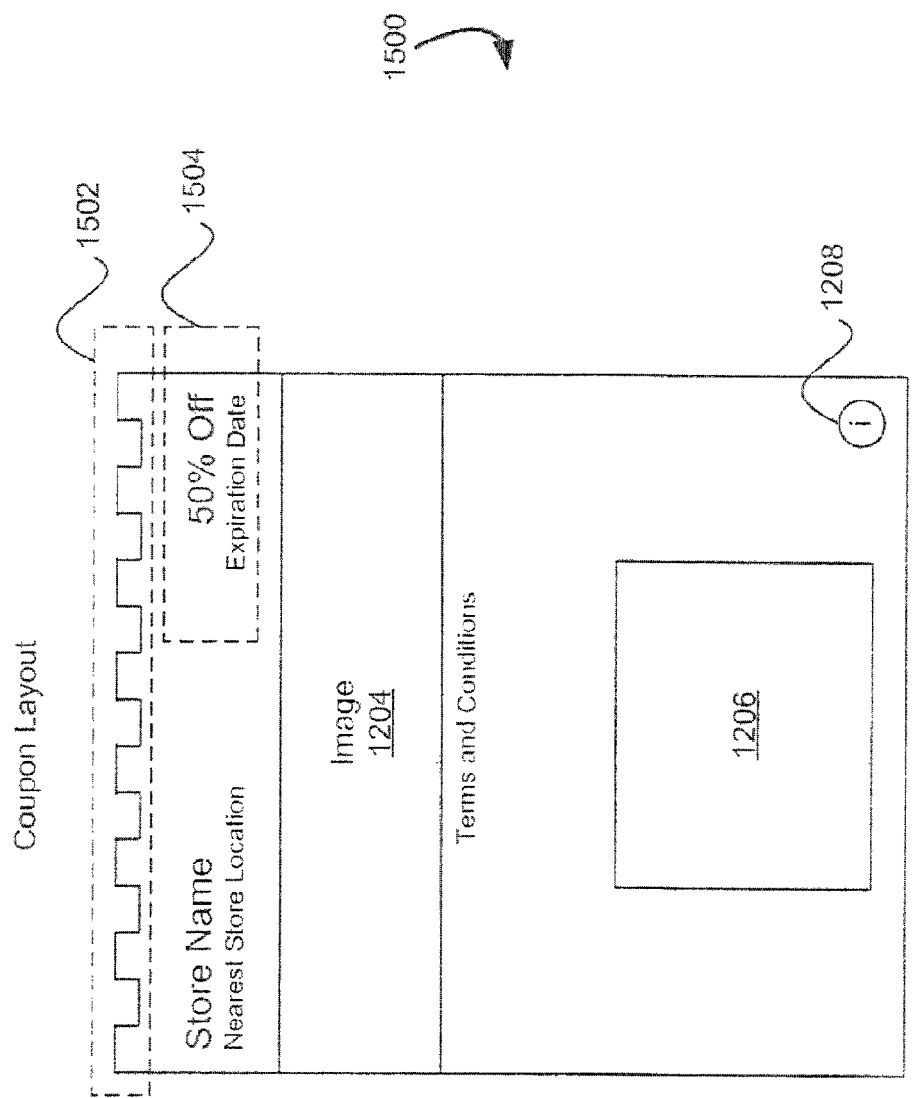
FIG. 15 illustrates an example discount coupon template.

FIG. 15 illustrates an example discount coupon template 1500. In some implementations, discount coupon template 1500 can specify the appearance of a discount coupon redeemable document. For example, a discount coupon redeemable document can correspond to a coupon for obtaining a discount on the purchase of items from a vendor or store. The appearance of the event ticket template can include an uneven, jagged or perforated edge 1502 at the top of the redeemable document, for example, to distinguish the discount coupon redeemable document from other redeemable documents. Discount coupon template 1500 can include data fields for presenting a vendor/store name, a location of the nearest store and/or terms and conditions associated with the discount coupon.

Discount coupon template 1500 can include a data field 1504 for presenting discount information. For example, the discount information can indicate a specific monetary discount (e.g., $5.00 oft) or a percentage discount (25% oft) that the user can get with the purchase of an item through the vendor or store. In some implementations, the discount information can be dynamically updated by the vendor. For example, the discount coupon can initially provide a discount of 10%. After a week the discount coupon can provide a discount of 20%. As the discount offered by the vendor increases (or decreases) the vendor can notify the user's mobile device of the change in information associated with the discount coupon redeemable document and the mobile device can update the redeemable document information to present the updated or changed discount. As described above, the changed information can be highlighted to draw the user's attention to the changed information.

Figure 16:
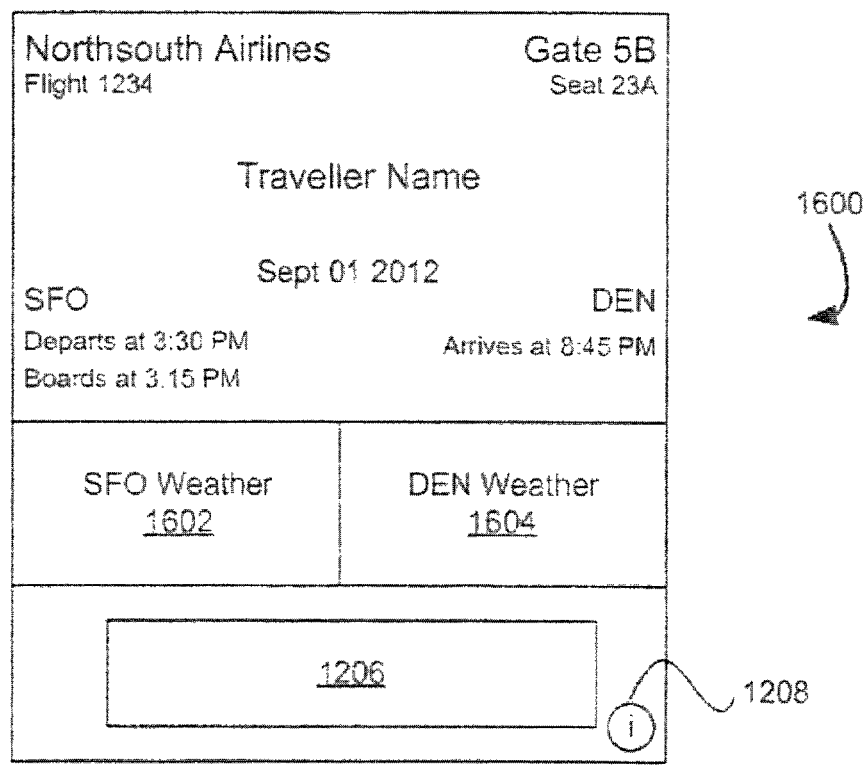
FIG. 16 illustrates an example boarding pass template.

FIG. 16 illustrates an example boarding pass template 1600. For example, the boarding pass template 1600 can provide data fields for presenting boarding pass redeemable document information. The boarding pass redeemable document information can include the name of the airline, flight number, gate number, seat number, departure location, departure time, boarding time, destination location and/or arrival time, for example. Boarding pass template 1600 can specify the locations where the redeemable document information will be presented when the boarding pass redeemable document is displayed. In some implementations, the boarding pass redeemable document information can be dynamically updated. For example, if there is a change in flight (e.g., the scheduled flight gets delayed or canceled) the information displayed on the boarding pass can be automatically updated to reflect the changed information. For example, a change in flight number, departure time, boarding time, gate number seat number, arrival time, etc., can cause an update to the data presented in the respective fields of boarding pass template 1600.

Boarding pass template 1600 can include dynamic information areas 1602 and 1604. For example, information area 1602 can present information (e.g., traffic, weather, etc.) associated with the flight departure location. Information area 1604 can present information (e.g., traffic, weather, etc.) associated with the destination location. The information in the dynamic information areas 1602 and 1604 can be obtained from various network (e.g., Internet) resources (e.g., websites for weather, traffic, etc.). The dynamic information areas 1602 and 1604 can be updated dynamically as the information changes, for example.

Figure 17:
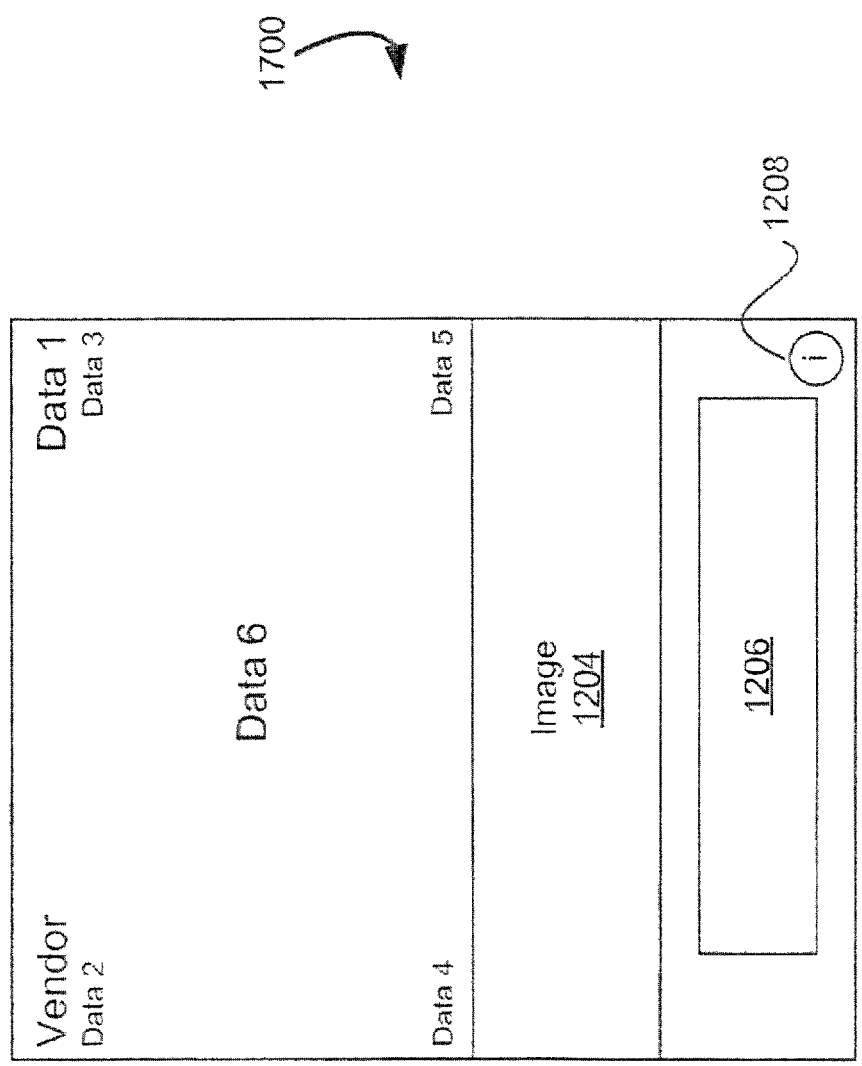
FIG. 17 illustrates an example generic redeemable document template.

FIG. 17 illustrates an example generic redeemable document template 1700. For example, generic redeemable document template 1700 can be used for determining the presentation of redeemable documents that do not fit into one of the redeemable document categories described above with respect to FIGS. 12-18. A vendor can provide redeemable document information that can be inserted into the various data fields provided by generic redeemable document template 1700. In some implementations, vendors can specify their own redeemable document formats. For example, redeemable document formats can be specified using a hypertext markup language (HTML). Thus, a redeemable document vendor can provide a vendor-specific redeemable document layout with a customized look and feel.

Figure 18:
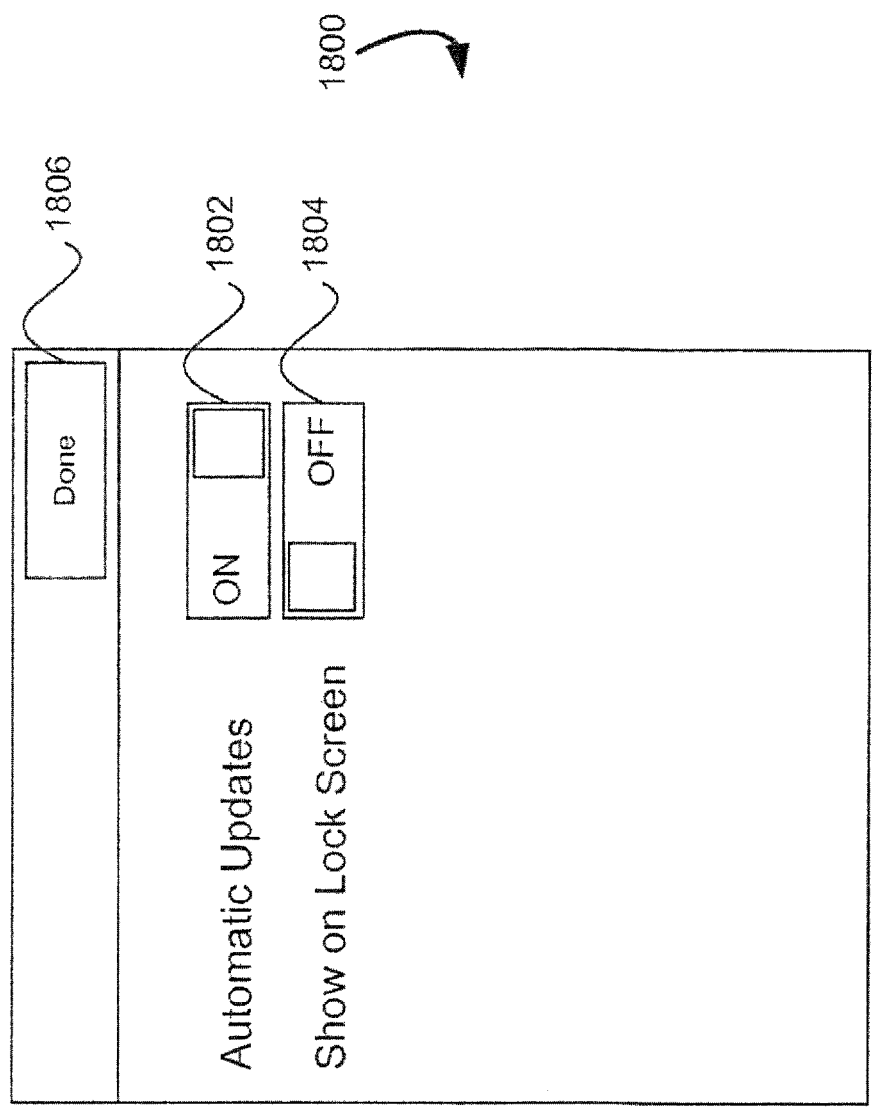
FIG. 18 illustrates an example graphical interface for specifying redeemable document options.

FIG. 18 illustrates an example graphical interface 1800 for specifying redeemable document options. For example, graphical interface 1800 can be invoked and displayed when a user selects graphical element 1208 of FIGS. 12-17. Graphical interface 1800 can include graphical element 1802 for turning on/off automatic redeemable document updates. For example, if a user turns on automatic redeemable document updates, the mobile device will receive notifications from the vendor when information associated with the associated redeemable document changes. The mobile device can then update the redeemable document information associated with the redeemable document and present the information on one of the user interfaces described above. For example, the updated information can be highlighted to reflect what information has changed. If the user turns off automatic redeemable document updates, automatic redeemable document will not be received. For example, the user will have to perform some action with respect to the redeemable document (e.g., cause the redeemable document to be displayed) for redeemable document updates to be received.

Graphical interface 1800 can include graphical element 1804 for specifying whether the redeemable document should be presented on the lock screen (e.g., graphical interface 300) of the mobile device. For example, the user can select graphical element 1804 to turn lock screen redeemable document notifications off. When the user turns off lock screen notifications, redeemable document notifications will not be displayed on the lock screen of the mobile device. The user can select graphical element 1804 to turn lock screen redeemable document notifications on. When the user turns on lock screen notifications, redeemable document notifications will be displayed on the mobile device, as described with reference to FIG. 3.

Figure 19:
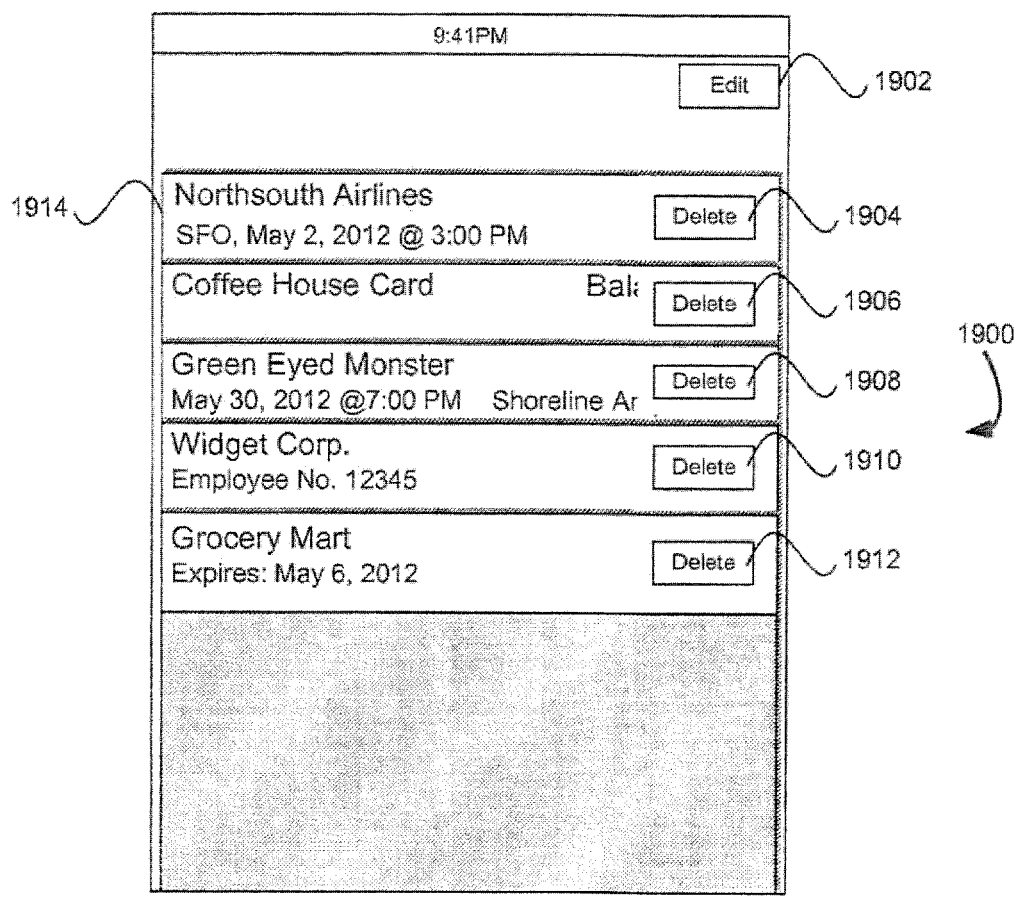
FIG. 19 illustrates an example graphical interface for deleting redeemable documents from the mobile device.

FIG. 19 illustrates an example graphical interface 1900 for deleting redeemable documents from the mobile device. For example, graphical interface 1900 can correspond to graphical interface 500 of FIG. 5. Graphical interface 1900 can include graphical element 1902 for invoking an edit mode for graphical interface 1900. For example, a user can select graphical element 1902 to cause graphical elements 1904-1912 (e.g., delete buttons) to be displayed. Alternatively, the user can provide input in the form of a touch gesture (e.g., a swipe gesture) across an individual redeemable document to enable editing of a particular redeemable document. For example, a user can perform a swipe gesture across redeemable document abstract 1914 to cause graphical element 1904 to appear. The user can select graphical element 1902 again to cause graphical elements 1904-1912 to disappear from display. The user can provide touch input (e.g., a tap) to graphical interface 1900 on an area that is not associated with graphical elements 1904-1912 to cause graphical elements 1904-1912 to be removed from display. In some implementations, a user can select one of graphical elements 1904-1912 to cause the corresponding redeemable document to be deleted.

Figure 20:
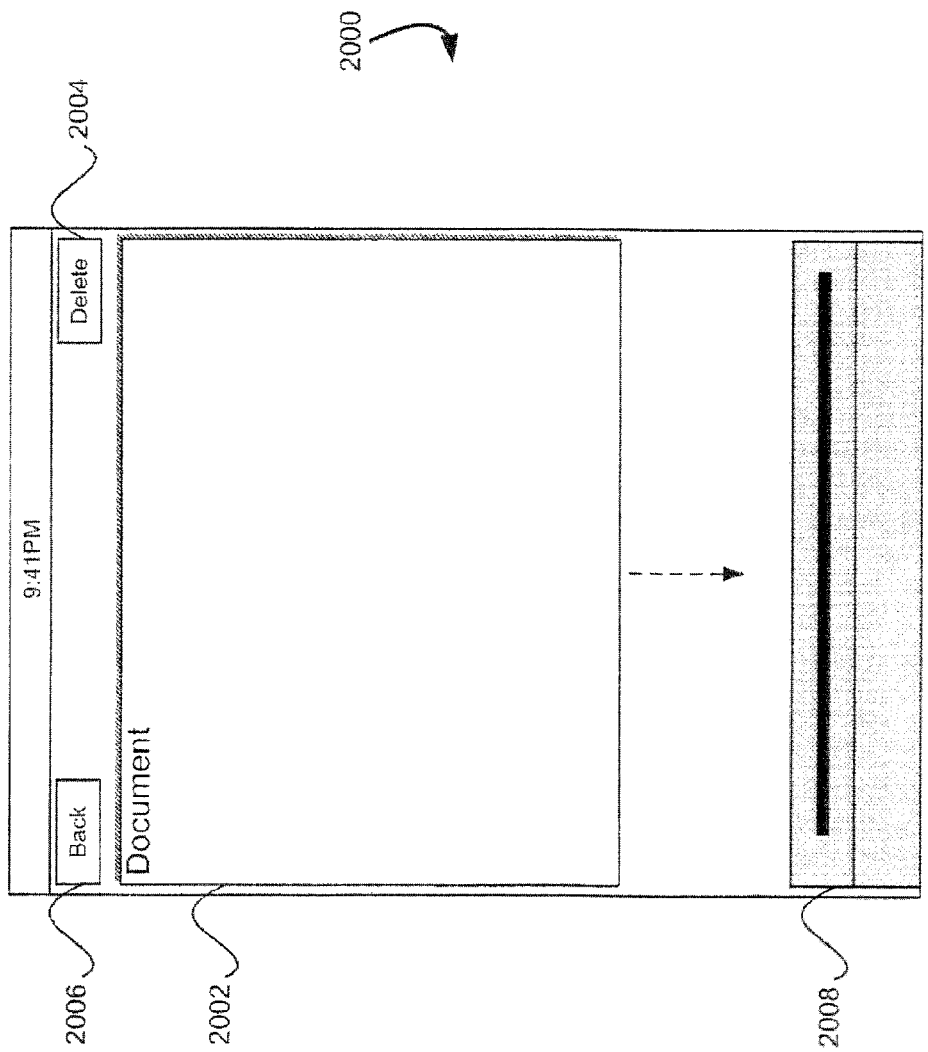
FIG. 20 illustrates an example graphical interface for deleting a redeemable document.

FIG. 20 illustrates an example graphical interface 2000 for deleting a redeemable document. For example, graphical element can be invoked by selecting a graphical element 1904-1912 of FIG. 19. Graphical interface 2000 can display redeemable document 2002 which can correspond to the redeemable document selected for deletion in graphical interface 1900 of FIG. 19. The user can delete redeemable document 2002 by selecting graphical element 2004. The user can cancel the deletion of redeemable document 2002 by selecting graphical element 2006.

In some implementations, when a user selects to delete a redeemable document, an animation can be presented. For example, a redeemable document shredder animation can be presented where redeemable document 2002 moves across graphical interface 200 and appears to enter graphical element 2008. For example, graphical element 2008 can have the appearance of a redeemable document shredder. As redeemable document 2002 enters graphical element 2008, redeemable document 2002 can appear to be shredded into strips or small pieces of paper, thereby simulating the destruction of redeemable document 2002. In some implementations, presentation of the redeemable document shredder animation can be accompanied by vibration of the mobile device.

In some implementations, when redeemable document 2002 is deleted a fire animation can be displayed. For example, the animation can cause redeemable document 2002 to appear to be set on fire and redeemable document 2002 can appear to be consumed by the fire. Ashes from the redeemable document fire can fall from redeemable document 2002 as it burns and disappear off the bottom of graphical interface 200. In some implementations, other redeemable document destruction animations (e.g., explosions, crumpling into a ball, dropping in a waste basket, tearing into pieces, etc.) can be presented.

Example Process

Figure 21:
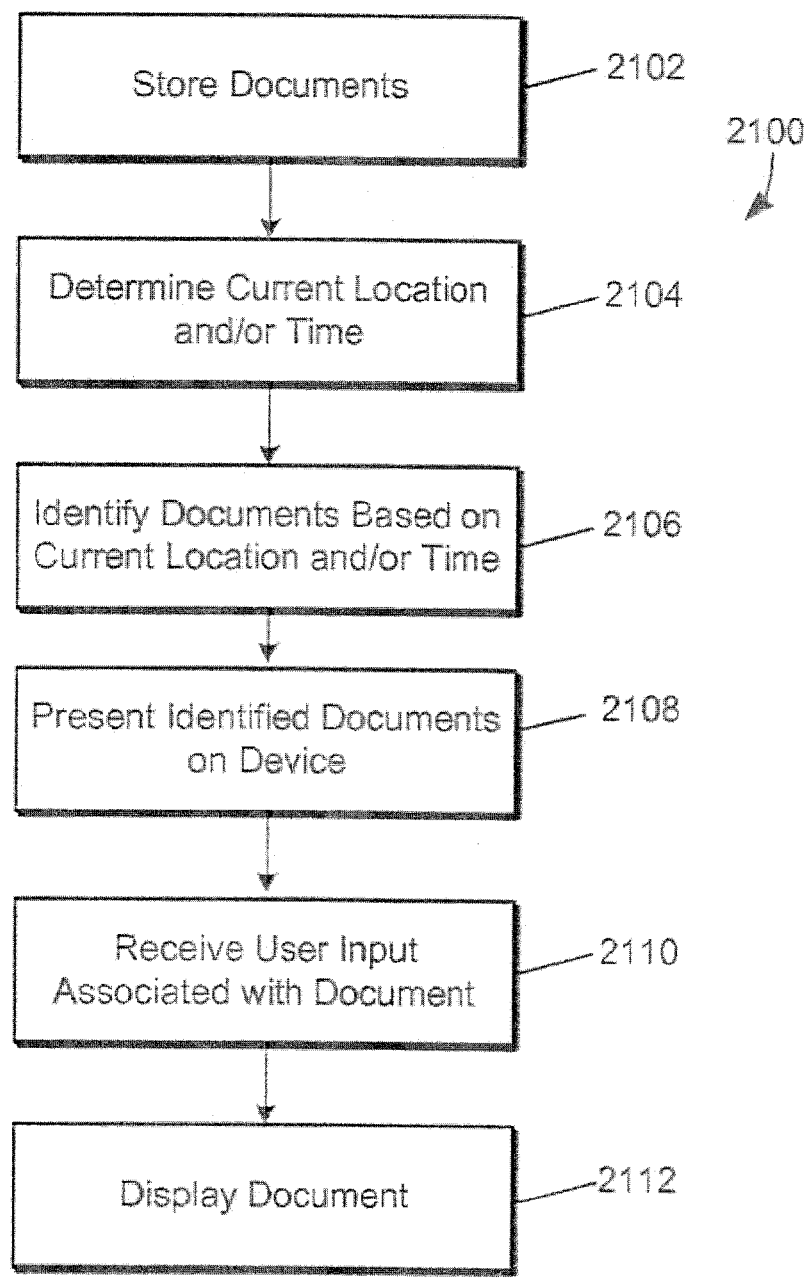
FIG. 21 is flow diagram of an example process for intelligently presenting redeemable document notifications on a mobile device.

FIG. 21 is flow diagram of an example process 2100 for intelligently presenting redeemable document notifications on a mobile device. At step 2102, redeemable documents can be stored on a mobile device. For example, the mobile device can store redeemable documents corresponding to boarding passes, customer loyalty cards, identification cards, event tickets, key cards, credit cards and/or any other type of redeemable document.

At step 2104, the current location of the mobile device and/or the current time can be determined. For example, the current location of the mobile device can be determined based on GNSS data, sensor data, wireless communication data or any other type of data that can be used to derive a geographic location of the mobile device. The current time can be determined based on a clock of the mobile device.

At step 2106, redeemable documents can be identified based on the current location and/or time. For example, each redeemable document can be associated with one or more locations. A customer loyalty card redeemable document can be associated with a business that has multiple store locations. The store locations can be downloaded with the redeemable document to the mobile device. In some implementations, only the store locations proximate (e.g., within 1 mile, within 5 miles, etc.) will be stored on the mobile device. The mobile device can use the store location information to identify redeemable documents associated with locations proximate to the mobile device. In some implementations, redeemable documents can be associated with a time (e.g., date and time). For example, redeemable documents can have expiration dates. The mobile device can use the date and/or time information associated with the redeemable document to identify redeemable documents associated with dates and/or times that are close to the current time.

In some implementations, redeemable documents can be identified based on a pattern of usage. For example, the mobile device can track when and/or where a redeemable document is most often used by the user. When the mobile device determines that the current location of the mobile device is at a location corresponding to frequent use of the redeemable document, the mobile device can present a redeemable document notification allowing the user to quickly access the redeemable document at the location. Similarly, when the mobile device determines that the current time corresponds to a time when the redeemable document is frequently used, the mobile device can present a redeemable document notification allowing the user to quickly access the redeemable document.

At step 2108, the identified redeemable documents can be presented on a display of the mobile device. When the mobile device is near a location associated with a redeemable document, a redeemable document notification can be presented on the display of the mobile device. As the current time nears the date/time associated with a redeemable document, a redeemable document notification can be presented on the display of the mobile device. In some implementations, the identified redeemable documents can be presented on a lock screen of the mobile device. For example, redeemable document notifications corresponding to the identified redeemable documents can be displayed on the lock screen of the mobile device so that the user can quickly access the redeemable documents from the lock screen interface.

At step 2110, user input associated with a redeemable document can be received. For example a user can select a redeemable document notification that has been presented on the lock screen of the mobile device to cause the corresponding redeemable document to be displayed at step 2112. Additional details of process 2100 are described with reference to FIGS. 1-20 above.

Figure 22:
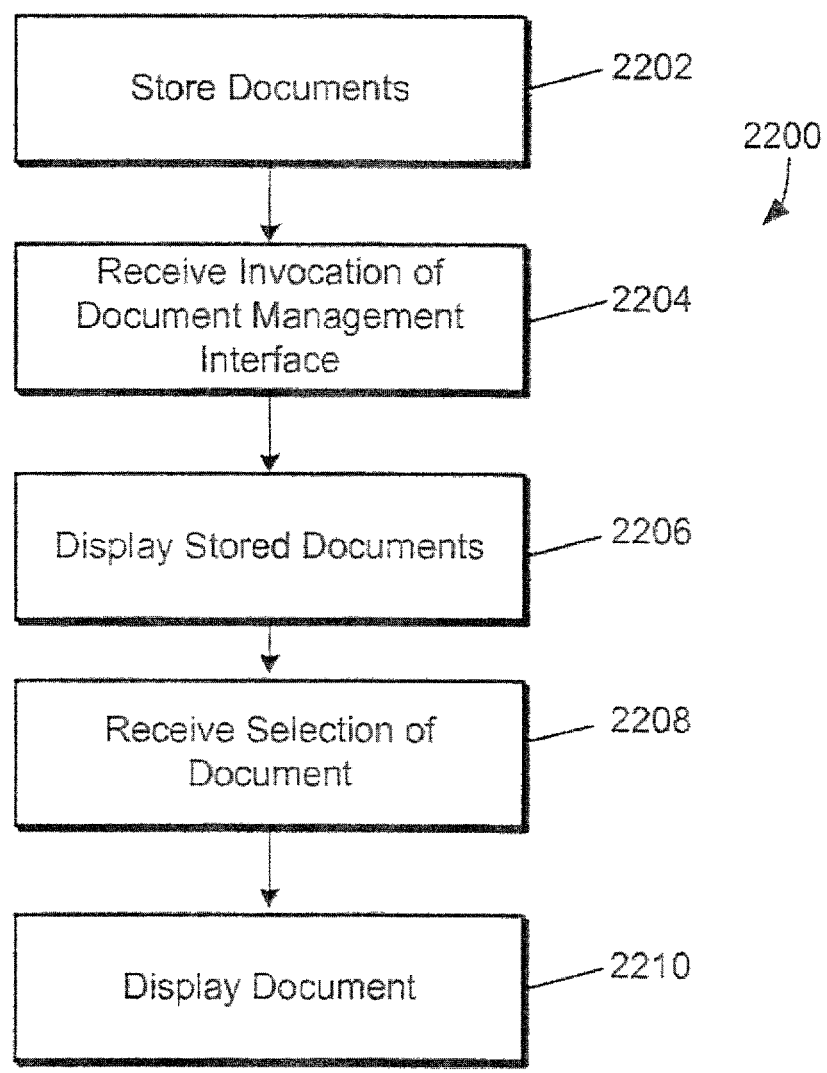
FIG. 22 is flow diagram of an example process for presenting redeemable documents on a mobile device.

FIG. 22 is flow diagram of an example process 2200 for presenting redeemable documents on a mobile device. At step 2202, redeemable documents can be stored on a mobile device. For example, the mobile device can store redeemable documents corresponding to boarding passes, customer loyalty cards, identification cards, event tickets, key cards, credit cards and/or any other type of redeemable document.

At step 2204, the mobile device can receive an invocation of a redeemable document management interface. For example, the user can invoke a redeemable document management application on the mobile device to view the redeemable documents that are stored on the mobile device. At step 2206, the mobile device can display the stored redeemable documents. For example, the mobile device can display the redeemable documents as described above with reference to FIGS. 3-19.

At step 2208, the mobile device can receive a selection of a redeemable document. For example, the user can provide input selecting a redeemable document abstract to cause the mobile device to present a full view of the associated redeemable document at step 2210. Additional details of process 2200 are described with reference to FIGS. 1-20 above.

Figure 23:
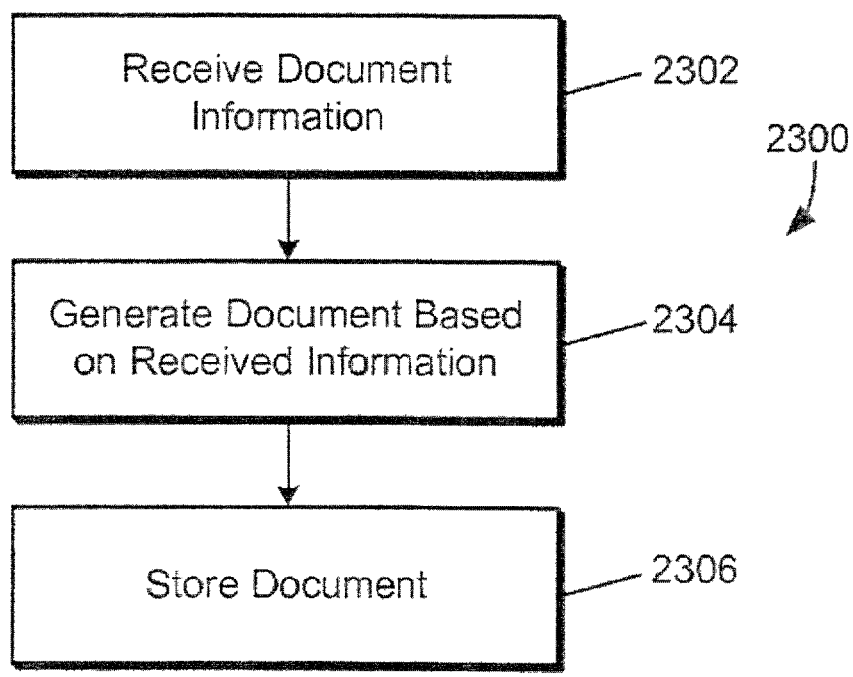
FIG. 23 is flow diagram of an example process for receiving and storing redeemable documents on a mobile device.

FIG. 23 is flow diagram of an example process 2300 for receiving and storing redeemable documents on a mobile device. At step 2302, redeemable document information can be received by the mobile device. For example, the mobile device can receive redeemable document information from a website through a browser. The mobile device can receive redeemable document information from vendor server through a client application stored on the mobile device. The mobile device can receive redeemable document information by email. The mobile device can receive redeemable document information through wireless transmission (e.g., near-field communication, Bluetooth, Wi-Fi, etc.). The mobile device can receive redeemable document information through an ad-hoc (e.g., device to device) network connection, for example.

The redeemable document information can be generated and transmitted as a result of a transaction between a user of the device and a redeemable document vendor. The transaction can be a purchase transaction. For example, the use can purchase a boarding pass, event ticket, or other redeemable document. The transaction can be a subscription transaction. For example, the user can subscribe to a customer loyalty program. Once the transaction is complete, the vendor can transmit the redeemable document information to the user.

At step 2304, a redeemable document can be generated based on the received redeemable document information. In some implementations, the redeemable document information can include all of the information necessary for generating a redeemable document on the mobile device. For example, the vendor-provided redeemable document information can include all of the information needed to identify a redeemable document template and populate the redeemable document template with data. In some implementations, the redeemable document information can include only a minimum amount of information needed to retrieve the full set of redeemable document information from a vendor server. For example, the minimum amount of information can include a transaction identifier, account identifier, user identifier, or other information that can be used to retrieve redeemable document information from the vendor's server. Once the identifier (e.g., transaction identifier) is received, the mobile device can access the vendor's server and download the complete information for the redeemable document. Once the mobile device has a complete set of redeemable document information, the mobile device can generate the redeemable document. The redeemable document can then be stored on the mobile device at step 2306. Additional details of process 2300 are described with reference to FIGS. 1-20 above.

Example System Architecture

Figure 24:
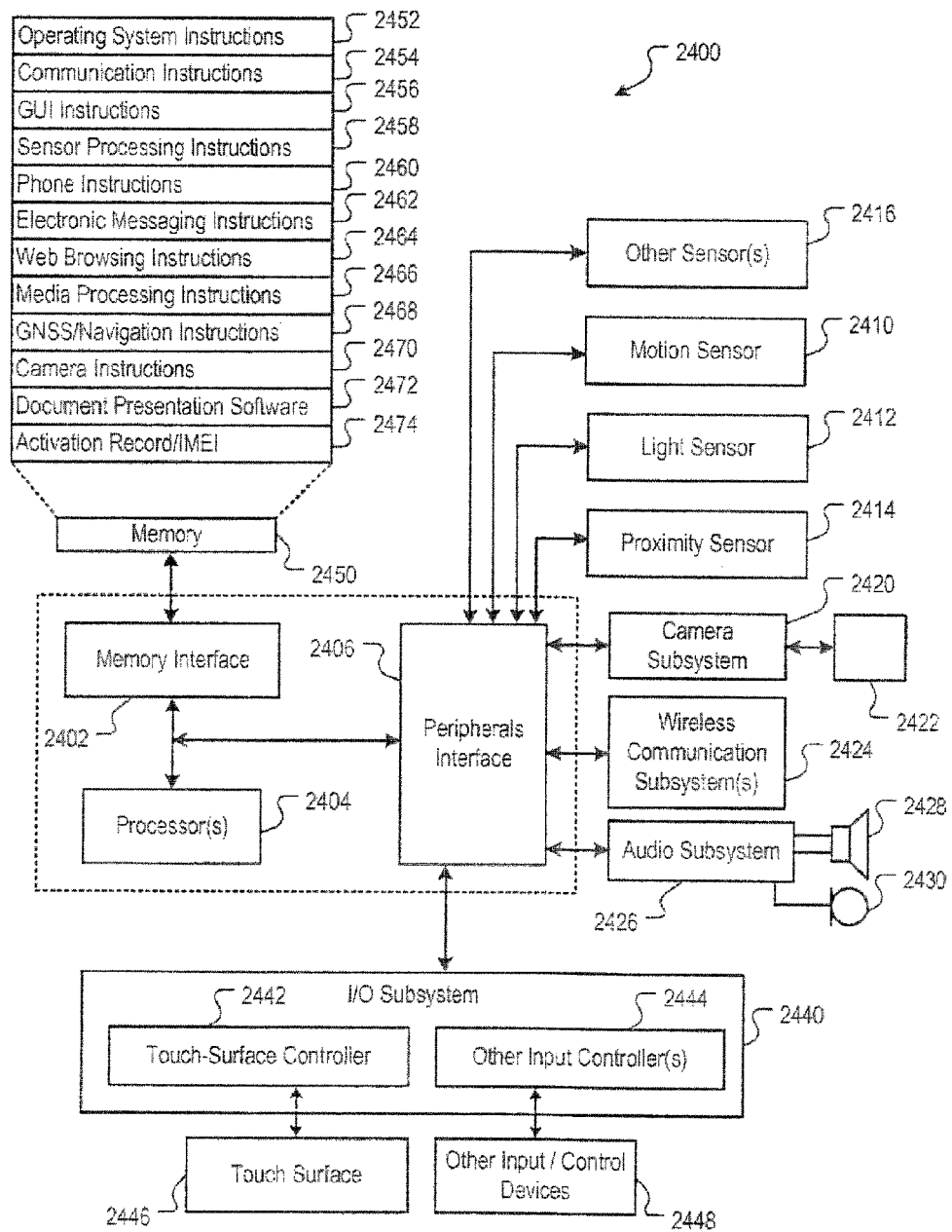
FIG. 24 is a block diagram of an exemplary system architecture implementing the features and processes of FIGS. 1-23.

FIG. 24 is a block diagram of an example computing device 2400 that can implement the features and processes of FIGS. 1-23. The computing device 2400 can include a memory interface 2402, one or more data processors, image processors and/or central processing units 2404, and a peripherals interface 2406. The memory interface 2402, the one or more processors 2404 and/or the peripherals interface 2406 can be separate components or can be integrated in one or more integrated circuits. The various components in the computing device 2400 can be coupled by one or more communication buses or signal lines.

Sensors, devices, and subsystems can be coupled to the peripherals interface 2406 to facilitate multiple functionalities. For example, a motion sensor 2410, a light sensor 2412, and a proximity sensor 2414 can be coupled to the peripherals interface 2406 to facilitate orientation, lighting, and proximity functions. Other sensors 2416 can also be connected to the peripherals interface 2406, such as a global navigation satellite system (GNSS) (e.g., GPS receiver), a temperature sensor, a biometric sensor, or other sensing device, to facilitate related functionalities.

A camera subsystem 2420 and an optical sensor 2422, e.g., a charged coupled device (CCD) or a complementary metal-oxide semiconductor (CMOS) optical sensor, can be utilized to facilitate camera functions, such as recording photographs and video clips. The camera subsystem 2420 and the optical sensor 2422 can be used to collect images of a user to be used during authentication of a user, e.g., by performing facial recognition analysis.

Communication functions can be facilitated through one or more wireless communication subsystems 2424, which can include radio frequency receivers and transmitters and/or optical (e.g., infrared) receivers and transmitters. The specific design and implementation of the communication subsystem 2424 can depend on the communication network(s) over which the computing device 2400 is intended to operate. For example, the computing device 2400 can include communication subsystems 2424 designed to operate over a GSM network, a GPRS network, an EDGE network, a Wi-Fi or WiMax network, and a Bluetooth™ network. In particular, the wireless communication subsystems 2424 can include hosting protocols such that the device 100 can be configured as a base station for other wireless devices.

An audio subsystem 2426 can be coupled to a speaker 2428 and a microphone 2430 to facilitate voice-enabled functions, such as speaker recognition, voice replication, digital recording, and telephony functions. The audio subsystem 2426 can be configured to facilitate processing voice commands for invoking the features and processes described above with reference to FIGS. 1-23.

The I/O subsystem 2440 can include a touch-surface controller 2442 and/or other input controller(s) 2444. The touch-surface controller 2442 can be coupled to a touch surface 2446. The touch surface 2446 and touch-surface controller 2442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2446.

The other input controller(s) 2444 can be coupled to other input/control devices 2448, such as one or more buttons, rocker switches, thumb-wheel, infrared port, USB port, and/or a pointer device such as a stylus. The one or more buttons (not shown) can include an up/down button for volume control of the speaker 2428 and/or the microphone 2430.

In one implementation, a pressing of the button for a first duration can disengage a lock of the touch surface 2446; and a pressing of the button for a second duration that is longer than the first duration can turn power to the computing device 2400 on or off. Pressing the button for a third duration can activate a voice control, or voice command, module that enables the user to speak commands into the microphone 2430 to cause the device to execute the spoken command. The user can customize a functionality of one or more of the buttons. The touch surface 2446 can, for example, also be used to implement virtual or soft buttons and/or a keyboard.

In some implementations, the computing device 2400 can present recorded audio and/or video files, such as MP3, AAC, and MPEG files. In some implementations, the computing device 2400 can include the functionality of an MP3 player, such as an iPod™ The computing device 2400 can, therefore, include a 36-pin connector that is compatible with the iPod. Other input/output and control devices can also be used.

The memory interface 2402 can be coupled to memory 2450. The memory 2450 can include high-speed random access memory and/or non-volatile memory, such as one or more magnetic disk storage devices, one or more optical storage devices, and/or flash memory (e.g., NAND, NOR). The memory 2450 can store an operating system 2452, such as Darwin, RTXC, LINUX, UNIX, OS X, WINDOWS, or an embedded operating system such as VxWorks.

The operating system 2452 can include instructions for handling basic system services and for performing hardware dependent tasks. In some implementations, the operating system 2452 can be a kernel (e.g., UNIX kernel). In some implementations, the operating system 2452 can include instructions for intelligent presentation of redeemable documents. For example, operating system 2452 can implement the redeemable document notification features as described with reference to FIGS. 1-23.

The memory 2450 can also store communication instructions 2454 to facilitate communicating with one or more additional devices, one or more computers and/or one or more servers. The memory 2450 can include graphical user interface instructions 2456 to facilitate graphic user interface processing; sensor processing instructions 2458 to facilitate sensor-related processing and functions; phone instructions 2460 to facilitate phone-related processes and functions; electronic messaging instructions 2462 to facilitate electronic-messaging related processes and functions; web browsing instructions 2464 to facilitate web browsing-related processes and functions; media processing instructions 2466 to facilitate media processing-related processes and functions; GNSS/Navigation instructions 2468 to facilitate GNSS and navigation-related processes and instructions; and/or camera instructions 2470 to facilitate camera-related processes and functions.

The memory 2450 can store other software instructions 2472 to facilitate other processes and functions, such as the security and/or authentication processes and functions as described with reference to FIGS. 1-23. For example, the software instructions can include instructions for receiving, generating, storing and presenting redeemable documents as described above with reference to FIGS. 1-23.

The memory 2450 can also store other software instructions (not shown), such as web video instructions to facilitate web video-related processes and functions; and/or web shopping instructions to facilitate web shopping-related processes and functions. In some implementations, the media processing instructions 2466 are divided into audio processing instructions and video processing instructions to facilitate audio processing related processes and functions and video processing-related processes and functions, respectively. An activation record and International Mobile Equipment Identity (IMEI) 2474 or similar hardware identifier can also be stored in memory 2450.

Each of the above identified instructions and applications can correspond to a set of instructions for performing one or more functions described above. These instructions need not be implemented as separate software programs, procedures, or modules. The memory 2450 can include additional instructions or fewer instructions. Furthermore, various functions of the computing device 2400 can be implemented in hardware and/or in software, including in one or more signal processing and/or application specific integrated circuits.

Figure 25:
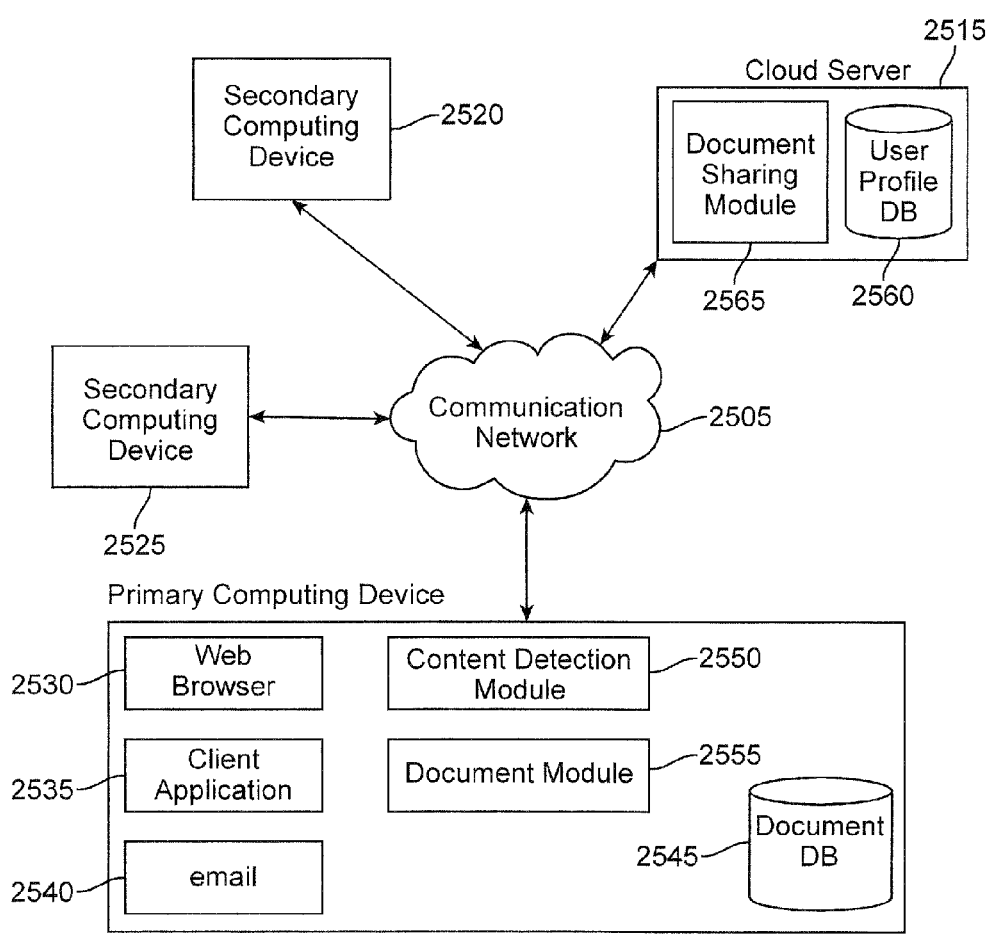
FIG. 25 illustrates an exemplary system embodiment in which a computing device can detect a redeemable document and transmit the redeemable document to secondary computing devices.

FIG. 25 illustrates an exemplary system embodiment in which a computing device can detect a redeemable document and transmit the redeemable document to other computing devices. As illustrated, multiple computing devices can be connected to a communication network 2505 and configured to communicate with each other through use of the communication network 2505. The communication network 2505 can be any type of network, including a local area network ("LAN"), such as an intranet, a wide area network ("WAN"), such as the internet, or any combination thereof. Further, the communication network 2505 can be a public network, a private network, or a combination thereof. The communication network 2505 can also be implemented using any type or types of physical media, including wired communication paths and wireless communication paths associated with one or more service providers. Additionally, the communication network 2505 can be configured to support the transmission of messages formatted using a variety of protocols. For example, the communication interface can be configured to support the transmission of messages using an established transmission protocol such as Bluetooth® or other similar type of communication standard or protocol.

A computing device can be any type of general computing device capable of network communication with other computing devices. For example, a computing device can be a personal computing device such as a desktop or workstation, a business server, or a portable computing device, such as a laptop, smart phone, or a post-pc device. A computing device can include some or all of the features, components, and peripherals of computing device 3100 of FIG. 31 described below.

To facilitate communication with other computing devices, a computing device can also include a communication interface configured to receive a communication, such as a request, data, etc., from another computing device in network communication with a computing device and pass the communication along to an appropriate module running on the computing device. The communication interface can also be configured to send a communication to another computing device in communication with the computing device.

FIG. 25 illustrates four computing devices, e.g., a primary computing device 2510, a cloud server 2515, and two secondary computing devices 2520, 2525 communicating with each other to send and receive data.

The primary computing device 2510 can include applications that a user of the primary computing device can use to obtain various redeemable documents. For example, the primary computing device 2510 can include a web browser 2530. The web browser 2530 can be used to access content such as webpages where the user can purchase tickets to an event, boarding passes for travel or other types of redeemable documents. The web browser 2530 can be used to access webpages where the user can subscribe to customer loyalty programs of various vendors or commercial enterprises. Redeemable document information generated by these transactions and defining the redeemable document can be downloaded or transmitted to the primary computing device 2510 through the web browser 2530. For example, redeemable document information associated with the purchased ticket, boarding pass or other redeemable documents can be transmitted to the primary computing device 2510 through the web browser 2530. Further redeemable document information associated with a customer loyalty card or account generated by the user's subscription to a customer loyalty program can be transmitted to the primary computing device 2510 through the web browser 2530.

The primary computing device 2510 can also include a client application 2535. For example, the client application 2535 can be an application to access a network (e.g., Internet) service that allows a user to download redeemable documents. For example, in some embodiments, the client application 2535 can allow the user to purchase event tickets and download the event tickets to the primary computing device 2510. In some embodiments, the client application 2535 can be a travel application that allows the user to purchase airplane boarding passes and hotel accommodations. When a user purchases items through the client application 2535, redeemable document information associated with those purchases can be transmitted to the primary computing device 2510 through the client application 2535.

The primary computing device 2510 can also include an email application 2540. For example, instead of receiving redeemable documents through the web browser 2530 or the client application 2535, the primary computing device 2510 can receive redeemable document information as part of an email. For example, the web browser 2530 and/or the client application 2535 may not be configured to allow redeemable document downloads. Thus, if a user purchases a redeemable document using the web browser 2530 or the application 2535, the online vendor can send the user an email including redeemable document information.

The primary computing device can also include a redeemable document detection module 2550 configured to detect whether redeemable document information is included within content received through the web browser 2530, client application 2535 or email application 2540. Redeemable document information can be embedded within received content and the redeemable document detection module 2550 can be configured to scan the content and determine whether redeemable document information is included. For example, redeemable document information can be embedded within hypertext markup language (HTML) code describing a webpage that is received by the web browser application 2535 and the redeemable document detection module 2550 can be configured to scan the received HTML code to determine whether it contains redeemable document information. Alternatively, redeemable document information can be embedded within email data received by the email application 2540 and the redeemable document detection module can be configured to scan the email data and determine whether it contains a redeemable document.

In some embodiments, the redeemable document detection module 2550 can be configured to store detected redeemable document information. For example, the primary computing device can include a redeemable document database 2545 configured to store redeemable document data and the redeemable document detection module 2550 can be configured to store detected redeemable document data in the redeemable document database 2545. In some embodiments, the redeemable document detection module 2550 can be configured to store the entire redeemable document data in the redeemable document database 2545.

In some embodiments, the redeemable document detection module 2550 can be configured to store only a portion of the redeemable document data in the redeemable document database 2545. For example, the redeemable document detection module 2550 can be configured to store only redeemable document data describing the redeemable document such as a title of the redeemable document, originator of the redeemable document or subject of the redeemable document.

In some embodiments, the redeemable document detection module 2550 can be configured to store only data indicating the location of the redeemable document data within the content. The stored data can thus be used to locate the redeemable document if necessary. In some embodiments, the redeemable document detection module 2550 can be configured to store a combination of data describing the redeemable document and the location of redeemable document within the content.

In some embodiments, the redeemable document detection module 2555 can be configured to store only a portion of the redeemable document data in the redeemable document database 2545. For example, the redeemable document detection module 2555 can be configured to store only redeemable document data describing the redeemable document such as a title of the redeemable document, originator of the redeemable document or subject of the redeemable document.

In some embodiments, the redeemable document detection module 2555 can be configured to store only data indicating the location of the redeemable document data within the content. The stored data can thus be used to locate the redeemable document if necessary. In some embodiments, the redeemable document detection module 2555 can be configured to store a combination of data describing the redeemable document and the location of redeemable document within the content.

In addition to storing redeemable document information, the redeemable document detection module 2550 can also be configured to notify a redeemable document module 2555 that a redeemable document has been detected. The redeemable document module 2555 can be configured to analyze the redeemable document information and render the redeemable document on the primary computing device.

In some embodiments, the redeemable document detection module 2550 can be configured to notify the redeemable document module 2555 upon detecting a redeemable document, thus resulting in the redeemable document being rendered. In some embodiments, the redeemable document detection module 2550 can be configured to notify the user that a redeemable document was detected prior to notifying the redeemable document detection module 2555. For example, the redeemable document detection module 2550 can be configured to create a notification that the redeemable document was detected and present the notification to the user. In some embodiments the notification can be presented as part of the content and alert the user that a redeemable document was detected within the content. The notification can further include a user interface element, such as a button, configured to enable a user to view the redeemable document. Upon a user's selection of the user interface element, the redeemable document detection module 2550 can be configured to notify the redeemable document module 2555 that that the redeemable document was detected and thus the redeemable document can be rendered. This type of embodiment allows a user to select whether to view the detected redeemable document.

The redeemable document detection module 2550 can notify the redeemable document module 2555 in numerous ways. For example, in some embodiments, the redeemable document module 2555 can be a secondary application, such as a plugin, configured to communicate with an application such as applications 2520, 2535, 2540. The redeemable document detection module 2550 can notify the redeemable document module 2555 by sending a request to execute the secondary application. For example, the redeemable document detection module 2550 can be configured to send a request to the operating system that the redeemable document module 2555 be executed. Upon receiving the request, the operating system can execute the redeemable document module 2555.

In some embodiments, the redeemable document module 2555 can be a separate program. The redeemable document detection module 2550 can thus similarly notify the redeemable document module 2555 by sending a request to execute the redeemable document module 2555. For example, the redeemable document detection module 2550 can be configured to send a request to the operating system requesting that the redeemable document module 2550 be executed. Upon receiving the request, the operating system can execute the redeemable document module 2555.

In some embodiments, the redeemable document module 2555 can be an application running in the background, such as an operating system daemon. The redeemable document detection module 2550 can notify the redeemable document module by sending a data message notifying the redeemable document module that a redeemable document has been detected. For example, the redeemable document detection module 2550 can send the data message using an application programming interface (API) provided by the redeemable document module 2555.

In some embodiments, the redeemable document detection module 2550 and the redeemable document module 2555 can be part of the same program or application. For example, each module can be a different process defined by the same program. The redeemable document detection module 2550 can thus notify the redeemable document module 2555 by executing the appropriate API command to initiate the redeemable document module 2555 within the program.

In some embodiments, the notification can also include other data used by the redeemable document module 2555 to gather and render the redeemable document. For example, the notification can include data identifying the application that detected the redeemable document, the location of the redeemable document information, the redeemable document information itself, etc. These are just some examples and are not meant to be limiting. One skilled in the art would recognize, and the present disclosure appreciates, that any data or amount of data can be included as part of the notification.

Upon receiving a notification that a redeemable document has been detected, the redeemable document module 2555 can be configured to gather the detected redeemable document data and render the redeemable document. In some embodiments, the redeemable document module 2555 can be configured to communicate with the redeemable document database 2545 to gather the redeemable document information. For example, the redeemable document information can be stored in the redeemable document database 2545 and the redeemable document module 2555 can be configured to gather the redeemable document data from the redeemable document database 2545 and render the redeemable document.

In some embodiments, the redeemable document module 2555 can communication with the redeemable document database 2545 to gather data locating the redeemable document information in the content and use this data to gather the redeemable document information from the content directly. In some embodiments, the redeemable document module 2555 can be configured to rescan the content to gather the redeemable document information by identifying a MIME or file type associated with the redeemable document data.

Upon gathering the redeemable document information, the redeemable document module 2555 can be configured to render the redeemable document on the primary computing device 2510. In some embodiments, the redeemable document module 2555 can render the redeemable document in a new window displayed on the primary computing device. In some embodiments, the redeemable document module 2555 can render the redeemable document within the content rendered by the respective application.

In addition to gathering redeemable document information and rendering a redeemable document, the redeemable document module can also be configured to share the redeemable document with secondary computing devices 2520 2525 associated with the user. For example, this can be useful when a redeemable document such as a movie ticket is received on a desktop computer. The user may wish to have the tickets on a mobile phone as well so that they can be presented for admission at the movie theatre.

To accomplish this, the redeemable document module 2555 can be configured to communicate with a cloud server 2515. The cloud server 2515 can include a user profile database 2560 configured to store a user profile for each user of a computing device. The user profile can include any variety of information about a user, including a listing of all computing devices associated with the user. For example, the user database can include data that a user has 3 computing devices, a desktop computer, a smart phone and a tablet PC.

Additionally, the user profile database 2560 can include identifying data for each computing device. Identifying data can include data describing the computing device such as device type, device name, current operating system, unique user identifier, etc. Identifying data can also include data used to communicate with the device such as a phone number associated with the device, IP address, etc.

The cloud server 2515 can also include a redeemable document sharing module 2565 configured to communicate with the user profile database 2560 to search for and retrieve data stored in the user profile database 2560. The redeemable document module 2555 can be configured to send a command to the redeemable document sharing module 2565 to have the redeemable document transmitted to all secondary computing devices associated with the user. The command can further include the redeemable document information.

As illustrated, there are two secondary computing devices 2520 2525. The user profile associated with the user can include data that the user of the primary computing device 2510 is associated with both secondary computing devices 2520 2525. Upon receiving the command and determining that there are two secondary computing devices associated with the primary computing device, the redeemable document sharing module 2565 can transmit the redeemable document information to each secondary computing device 2520 2525. In some embodiments, the redeemable document sharing module 2565 can also be configured to store the redeemable document information in the user profile database 2560. For example, the redeemable document information can be associated with the user profile of the user of the primary computing device 2510.

Although the primary and secondary computing devices are illustrated as different types of devices, this is done only to aide in describing the system. The primary computing device 2510 can also be a secondary computing device 2520 2525 and the secondary computing devices 2520 2525 can also be a primary computing device. As such, each of the secondary computing devices 2520 2525 can include the components described as being included in the primary computing device. Each secondary computing device thus can include a redeemable document module configured to render the redeemable document information received from the cloud server 2515. Also, each secondary computing device 2520 2525 can include a redeemable document database and the redeemable document information received from the cloud server 2515 can be stored in the redeemable document database.

It should also be recognized that the number of secondary computing devices is only one example and not meant to be limiting. A primary computing device 2510 can be associated with any number of secondary computing devices, including none.

In some embodiments, the primary computing device 2510 can transmit the redeemable document data to the secondary computing devices 2520 2525 directly rather than through the cloud server 2515. For example, the redeemable document module can be configured to send a request to the redeemable document sharing module 2565 requesting profile data identifying the secondary computing devices associated with the user of the primary computing device 2510. The redeemable document sharing module 2565 can be configured to retrieve the requested data from the user profile database 2560 and transmit the data to the redeemable document module 2555. For example, the redeemable document module can send a request including an identifier identifying the user of the primary computing device 2510. The identifier can be used by the redeemable document sharing module 2565 to identify the user profile associated with the user in the user profile database 2560 and retrieve the requested data.

The redeemable document module 2555 can be configured to use the received data to transmit the redeemable document information to the secondary computing devices 2520 2525 directly. For example, in some embodiments, the received data can include identifying data that can be used by the redeemable document module 2555 to transmit the redeemable document information to the secondary computing devices 2520 2525.

In some embodiments, the redeemable document module 2555 can be configured enable a user to select whether to transmit the redeemable document information to secondary computing devices associated with the user. For example, the redeemable document module 2555 can be configured to send a request to the redeemable document sharing module 2565 requesting the secondary computing devices associated with the user. Upon receiving the data, the redeemable document module can present a user interface element to the user of the primary computing device 2510 offering to transmit the rendered redeemable document to the secondary computing devices. For example, the user interface element can be a button labeled "send to other device". The redeemable document module can be configured to, upon a user selecting the button, transmit the redeemable document information to the secondary computing devices.

In some embodiments, the redeemable document module 2550 can be configured to present one user interface element that, when selected, transmits the redeemable document information to all secondary computing devices associated with the user of the primary computing device. In some embodiments, the redeemable document module can be configured to present one user interface element for each secondary computing device associated with the user of the primary computing device 2510. Each button can be configured such that, upon selection, the redeemable document module 2555 can transmit the redeemable document information to the secondary computing device associated with the selected user interface element. Thus, a user can select which secondary computing devices to transmit the redeemable document information to.

In some embodiments, it can be determined that a secondary computing device is not capable of properly rendering the redeemable document. For example, data stored in the user profile database 2560 can indicate that the secondary computing device does not have the proper capabilities to properly render the redeemable document. This can be because of various reasons such as the secondary computing device not having the proper operating system version, hardware, etc. Upon a determination that the secondary computing device is not capable of rendering the redeemable document, the redeemable document module 2555 can be configured to notify the user that the secondary computing device is not capable of rendering the redeemable document. In some embodiments, a notification can be rendered on the computing device alerting the user that the secondary computing device cannot render the redeemable document and thus the redeemable document cannot be transmitted to the secondary computing device. In some embodiments, the notification can include information on how the secondary computing device can be upgraded to be able to render the redeemable document.

Figure 26:
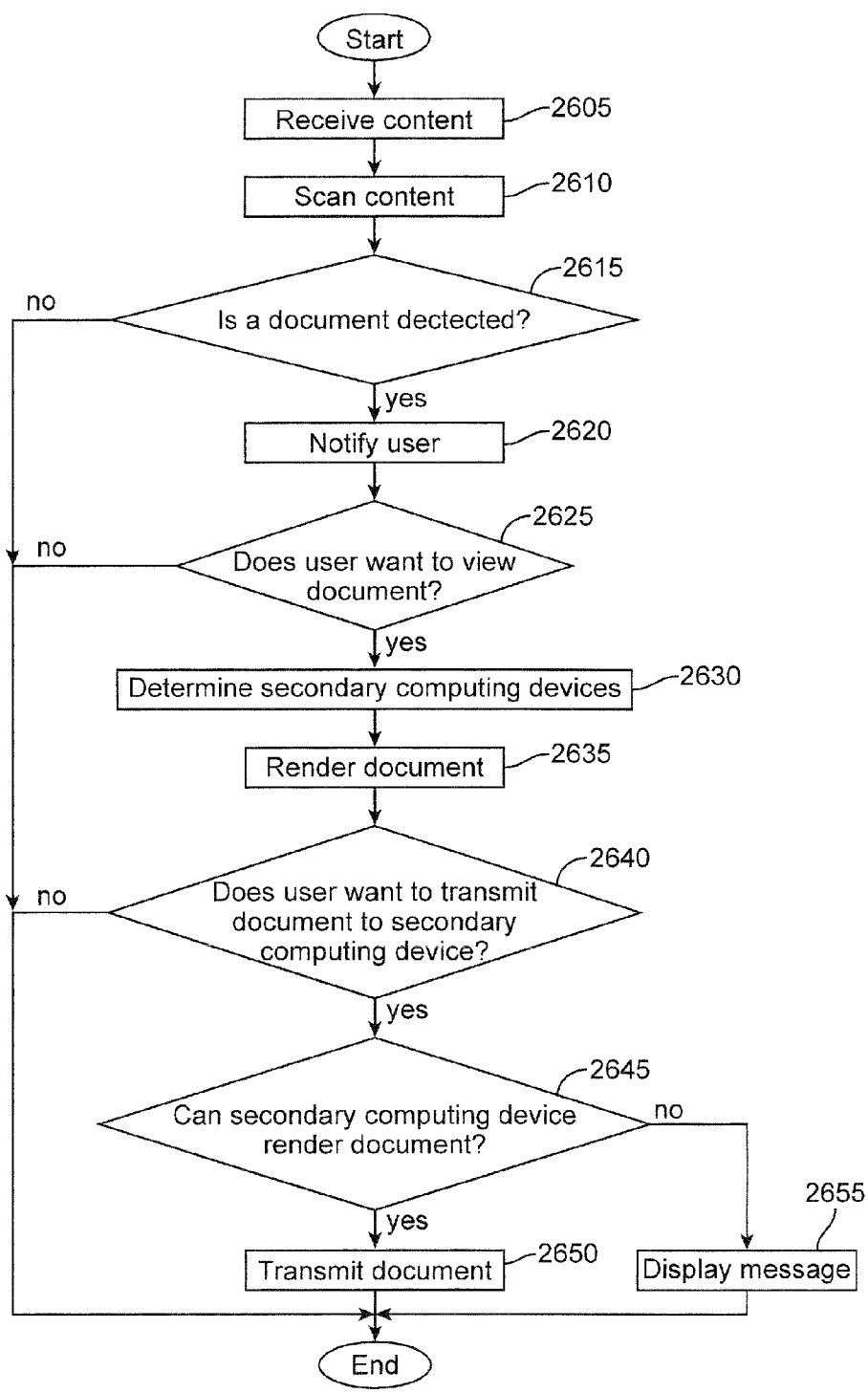
FIG. 26 illustrates an exemplary method embodiment of detecting a redeemable document and transmitting the redeemable document to secondary computing devices.

FIG. 26 illustrates an exemplary method embodiment of detecting a redeemable document within content received by a primary computing device and transmitting the redeemable document to secondary computing devices associated with the primary computing device. As illustrated, the method begins at block 2605 where content is received by a primary computing device. Content can be any type of content to be rendered on the primary computing device. For example, content can include web content such as HTML code, e-mail, an application, video, picture, etc.

The content can be received through use of an application running on the primary computing device. For example, the content can be received through a web browser application, a client application, an e-mail application, etc.

After the content is received, the method continues to block 2610 where the content is scanned for redeemable document information. Redeemable document information can be information defining a redeemable document. Redeemable document information can be identified by a unique file or MIME type associated with the information indicating that it is redeemable document information.

If at block 2615 it is determined that a redeemable document is detected, the method continues to block 2620 where a notification is presented to the user that a redeemable document was detected. For example, a notification can be presented with the content that alerts the user that a redeemable document has been detected within the content. Additionally, the notification can enable the user to select to view the redeemable document. For example, the notification can include a button prompting that allows a user to select to view the redeemable document. If at block 2615 a redeemable document is not detected, the method ends.

At block 2625, the method determines whether an indication has been received that the user wishes to view the detected redeemable document. For example, the user selecting the button provided with the notification can be an indication that the user wishes to view the redeemable document. If an indication is not received, the method ends. If an indication is received, the method continues to block 2630 where the method determines any secondary computing devices associated with the user. For example, in some embodiments, a user profile associated with the user can store data identifying all secondary computing devices associated with the user.

Once the secondary computing devices are determined, the method continues to block 2635 where the redeemable document is rendered. The redeemable document can be rendered based upon the redeemable document information included in the content. In addition to rendering the redeemable document, a button enabling a user to transmit the redeemable document to any secondary computing device associated with the computing device can also be provided.

At block 2640 it is determined whether the user requested that the redeemable document be transmitted to secondary computing devices associated with the user. If the user did not request that the redeemable document be transmitted, the method ends.

If at 2640 it is determined that the user did request that the redeemable document be transmitted to secondary computing devices, the method continues to block 2645 where it is determined whether the secondary computing devices are capable of rendering the redeemable document. It can be determined whether a secondary computing device can render the redeemable document in numerous ways. For example, in some embodiments, a request for information can be sent directly to the secondary computing device and the data received as a result of the request can be used to determine whether the secondary computing device can render the redeemable document. For example, the request can be for system and hardware capabilities of the secondary computing device and based on the results the determination can be made. Alternatively, in some embodiments, data regarding the secondary computing device can be stored in the user profile associated with the user and the data can be accessed from the database.

If it is determined that the secondary device cannot render the redeemable document, the method continues to block 2655 where a message is displayed notifying the user that the redeemable document cannot be rendered on the secondary computing device. The method then ends.

If at block 2645 it is determined that the secondary computing device can render the redeemable document, the method continues to block 2650 where the redeemable document is transmitted to the secondary device. The method then ends.

Figure 27:
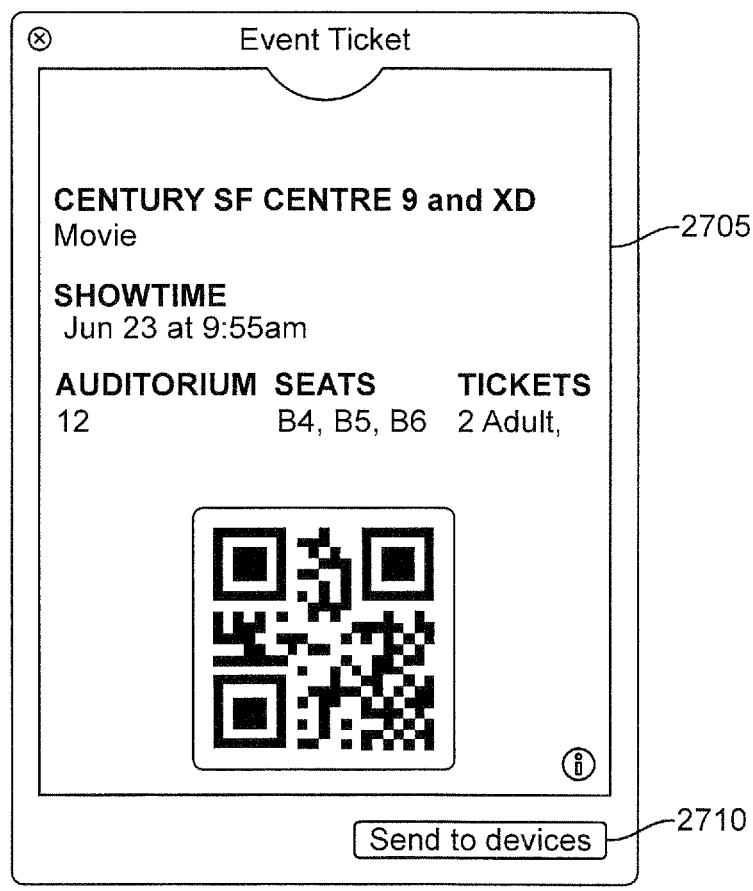
FIG. 27 illustrates a screenshot of an exemplary embodiment of a rendered redeemable document.

FIG. 27 illustrates a screenshot of an exemplary embodiment of a rendered redeemable document 2705. As illustrated, the rendered redeemable document 2705 is for a movie ticket. The rendered redeemable document 2705 can include information regarding the movie such as the theatre, show time, auditorium, seats, number and type of tickets. Further, the rendered redeemable document 2705 can also include a bar code that can be used by the theatre to register the ticket. The rendered redeemable document 2705 can also include a button 2710 enabling the user transmit the rendered redeemable document 2705 to secondary computing devices associated with the user. The user can select the button to transmit the rendered redeemable document 2705.

Figure 28:
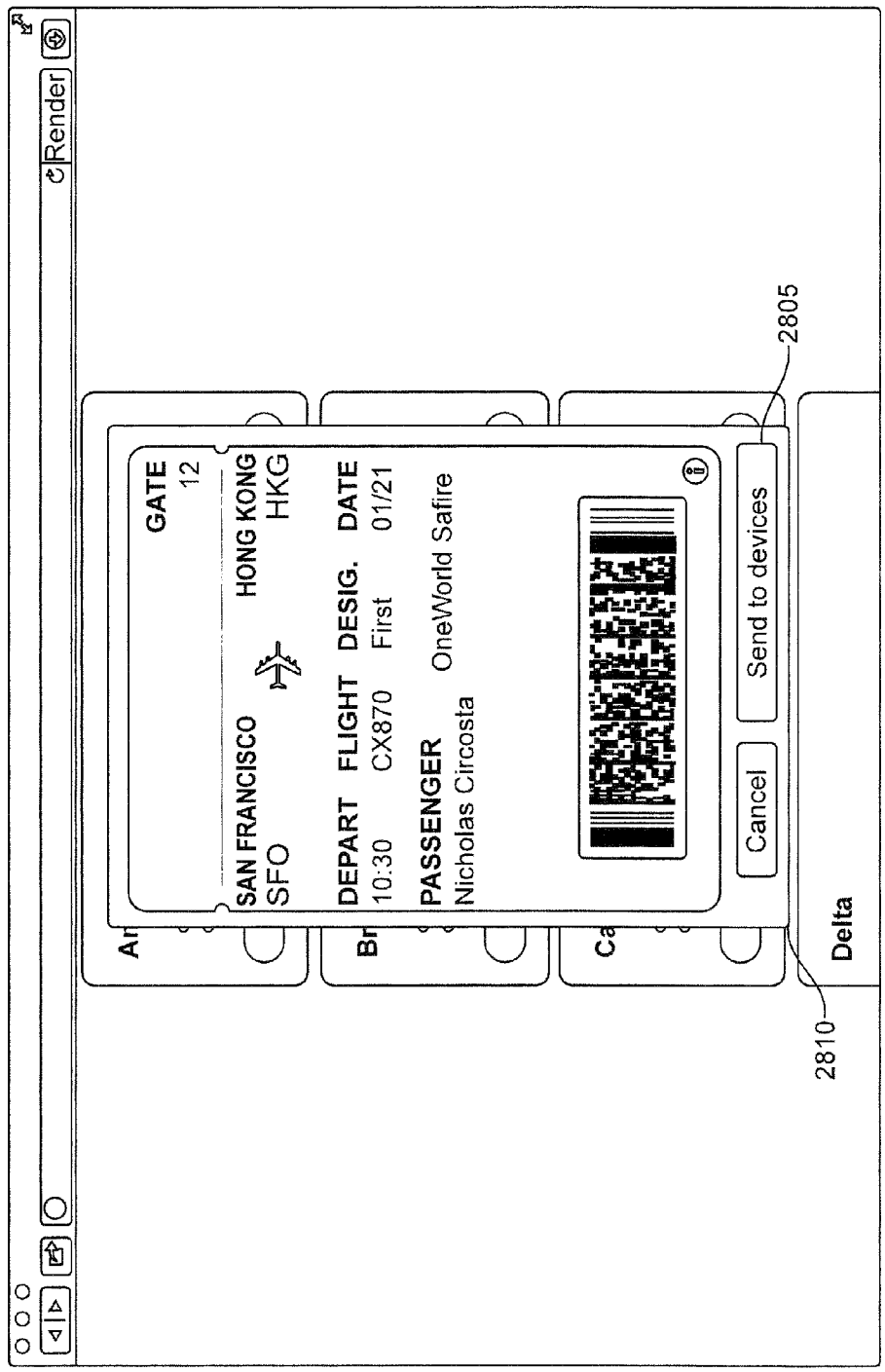
FIG. 28 illustrates a screenshot of an exemplary embodiment of a rendered redeemable document.

FIG. 28 illustrates another screenshot of an exemplary embodiment of a rendered redeemable document 2810. As illustrated the rendered redeemable document 2810 is a boarding pass for a flight. The rendered redeemable document 2810 can include information about the flight such as the airline, gate number, departure and arrival city, departure time, flight number, seat number, ticket type, passenger information, etc. Further, the rendered redeemable document can include a bar code enabling the airline to register the boarding pass.

The rendered redeemable document 2810 can also include an button 2805 enabling the user to transmit the redeemable document to secondary computing devices associated with the user. The user can simply select the button 2805 to transmit the button to the secondary computing devices.

In this embodiment, the rendered redeemable document 2810 was received through a web browser application. As illustrated, the rendered redeemable document can be rendered in a secondary window above the web browser application.

Figure 29:
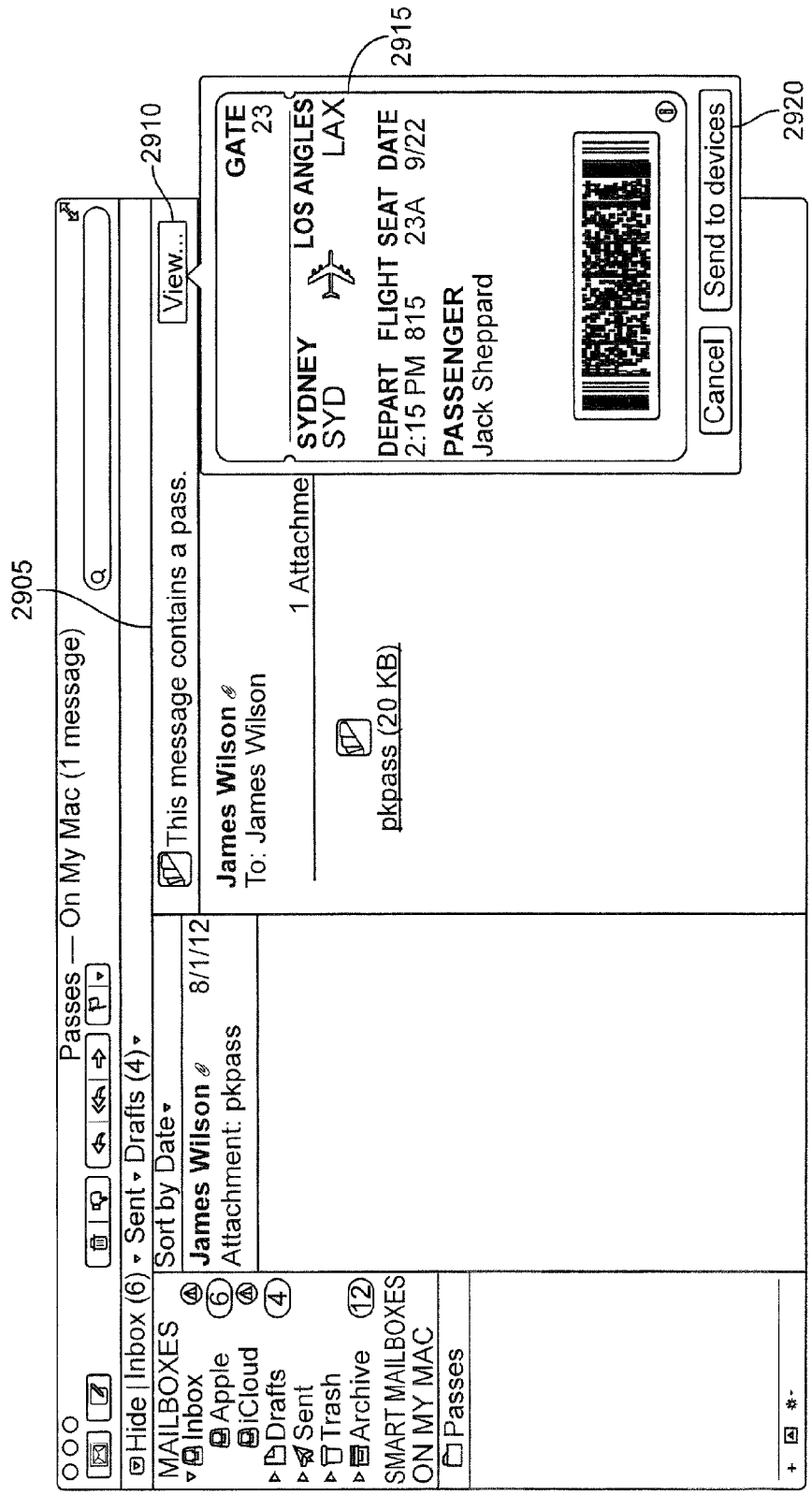
FIG. 29 illustrates a screenshot of an exemplary embodiment of a rendered redeemable document.

FIG. 29 illustrates another screenshot of an exemplary embodiment of a rendered redeemable document 2915. As illustrated, the rendered redeemable document 2915 can include a button 2920 configured to enable the user to transmit the redeemable document to secondary computing devices associated with the user.

In this embodiment, the rendered redeemable document 2915 was received through an email application. As illustrated, a notification that the redeemable document was detected 2905 is presented to the user. Additionally, a button 2910 enabling the user to view the detected redeemable documented is presented. The button 2910 can be configured to enable rendering the detected redeemable document upon selection. In this embodiment, the user has selected the button 2910 and the rendered redeemable document 2915 has been rendered in a secondary window above the email application.

Figure 30:
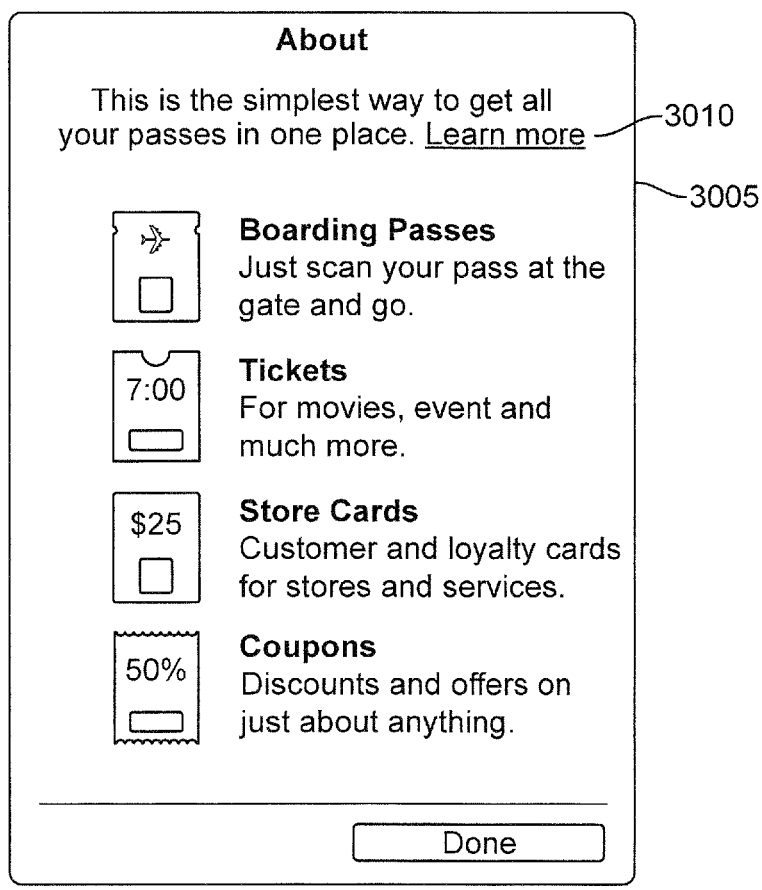
FIG. 30 illustrates a screenshot of an exemplary message rendered upon a determination that a secondary computing device cannot render the redeemable document.

FIG. 30 illustrates a screenshot of an exemplary message rendered when a secondary computing device cannot render a redeemable document. As illustrated, a message 3005 providing information about the benefits of enabling the secondary computing device to render the redeemable documents is presented. The message can include information regarding the benefits and the types of redeemable documents that can be rendered, including boarding passes, tickets, store cards, coupons, etc. Further, the message 3005 can include an active link 3010 to further information. The user can easily access further information by selecting the active link 3010.

Figure 31:
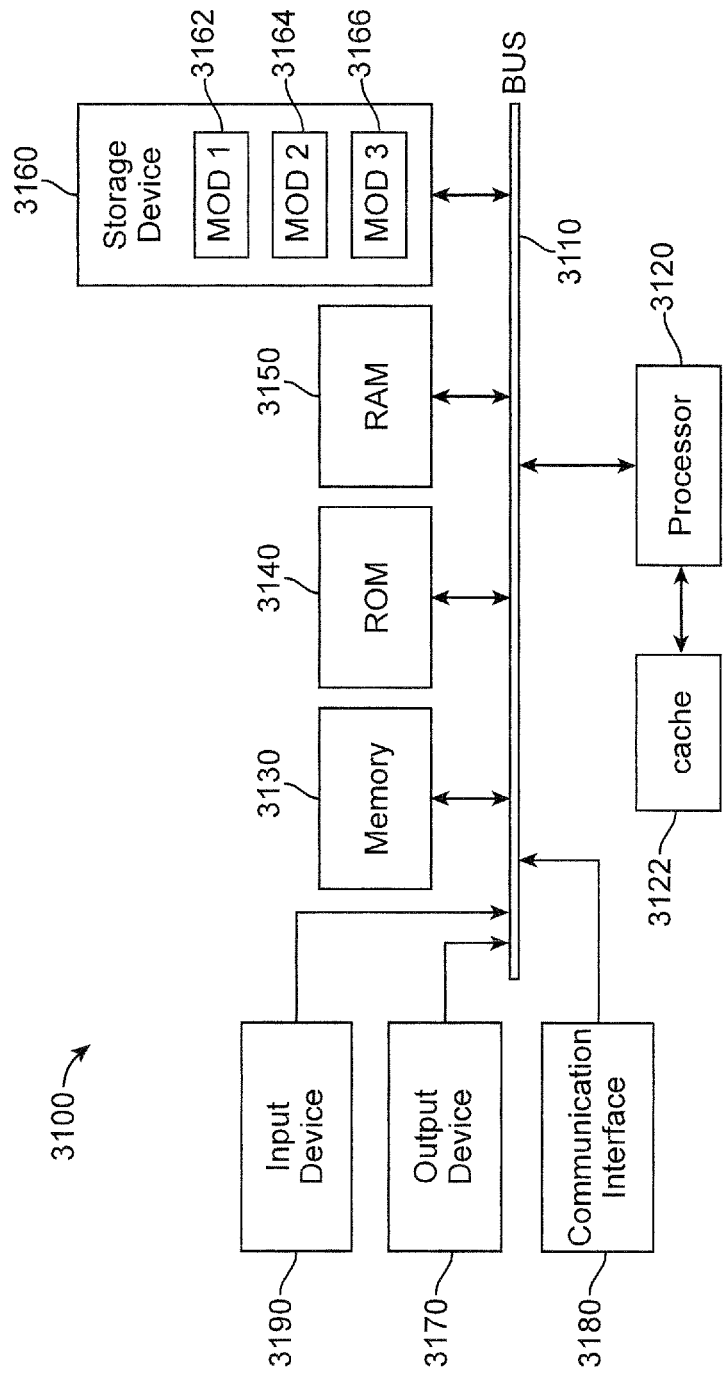
FIG. 31 illustrates an exemplary system embodiment of a general-purpose computing device.

FIG. 31 illustrates an exemplary system 3100 that includes a general-purpose computing device 3100, including a processing unit (CPU or processor) 3120 and a system bus 3110 that couples various system components including the system memory 3130 such as read only memory (ROM) 3140 and random access memory (RAM) 3150 to the processor 3120. The system 3100 can include a cache 3122 of high speed memory connected directly with, in close proximity to, or integrated as part of the processor 3120. The system 3100 copies data from the memory 3130 and/or the storage device 3160 to the cache 3122 for quick access by the processor 3120. In this way, the cache 3122 provides a performance boost that avoids processor 3120 delays while waiting for data. These and other modules can control or be configured to control the processor 3120 to perform various actions. Other system memory 3130 may be available for use as well. The memory 3130 can include multiple different types of memory with different performance characteristics. It can be appreciated that the disclosure may operate on a computing device 3100 with more than one processor 3120 or on a group or cluster of computing devices networked together to provide greater processing capability. The processor 3120 can include any general purpose processor and a hardware module or software module, such as module 1 3162, module 2 3164, and module 3 3166 stored in storage device 3160, configured to control the processor 3120 as well as a special-purpose processor where software instructions are incorporated into the actual processor design. The processor 3120 may essentially be a completely self-contained computing system, containing multiple cores or processors, a bus, memory controller, cache, etc. A multi-core processor may be symmetric or asymmetric.

The system bus 3110 may be any of several types of bus structures including a memory bus or memory controller, a peripheral bus, and a local bus using any of a variety of bus architectures. A basic input/output (BIOS) stored in ROM 3140 or the like, may provide the basic routine that helps to transfer information between elements within the computing device 3100, such as during start-up. The computing device 3100 further includes storage devices 3160 such as a hard disk drive, a magnetic disk drive, an optical disk drive, tape drive or the like. The storage device 3160 can include software modules 3162, 3164, 3166 for controlling the processor 3120. Other hardware or software modules are contemplated. The storage device 3160 is connected to the system bus 3110 by a drive interface. The drives and the associated computer readable storage media provide non-volatile storage of computer readable instructions, data structures, program modules and other data for the computing device 3100. In one aspect, a hardware module that performs a particular function includes the software component stored in a non-transitory computer-readable medium in connection with the necessary hardware components, such as the processor 3120, bus 3110, display 3170, and so forth, to carry out the function. The basic components are known to those of skill in the art and appropriate variations are contemplated depending on the type of device, such as whether the device 3100 is a small, handheld computing device, a desktop computer, or a computer server.

Although the exemplary embodiment described herein employs the hard disk 3160, it should be appreciated by those skilled in the art that other types of computer readable media which can store data that are accessible by a computer, such as magnetic cassettes, flash memory cards, digital versatile disks, cartridges, random access memories (RAMs) 3150, read only memory (ROM) 3140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 3100, an input device 3190 represents any number of input mechanisms, such as a microphone for speech, a touch-sensitive screen for gesture or graphical input, keyboard, mouse, motion input, speech and so forth. An output device 3170 can also be one or more of a number of output mechanisms known to those of skill in the art. In some instances, multimodal systems enable a user to provide multiple types of input to communicate with the computing device 3100. The communications interface 3180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 3120. The functions these blocks represent may be provided through the use of either shared or dedicated hardware, including, but not limited to, hardware capable of executing software and hardware, such as a processor 3120, that is purpose-built to operate as an equivalent to software executing on a general purpose processor. For example, the functions of one or more processors presented in FIG. 31 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 3140 for storing software performing the operations discussed below, and random access memory (RAM) 3150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 3100 shown in FIG. 31 can practice all or part of the recited methods, can be a part of the recited systems, and/or can operate according to instructions in the recited non-transitory computer-readable storage media. Such logical operations can be implemented as modules configured to control the processor 3120 to perform particular functions according to the programming of the module. For example, FIG. 31 illustrates three modules Mod1 3162, Mod2 3164 and Mod3 3166 which are modules configured to control the processor 3120. These modules may be stored on the storage device 3160 and loaded into RAM 3150 or memory 3130 at runtime or may be stored as would be known in the art in other computer-readable memory locations.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, by a processor of a primary computing device, content through a network connected application running on the primary computing device;
determining, by a background process running on the primary computing device, that the content includes metadata, which includes an identifier that identifies the content as including a redeemable document;
retrieving redeemable document information from the content and storing the retrieved redeemable document information in a database on the primary computing device, the redeemable document information including a redeemable document template identifier that identifies a predefined redeemable document template;
detecting the redeemable document template identifier stored in the database on the primary computing device by a redeemable document management application, the redeemable document management application having access to a plurality of predefined redeemable document templates wherein each of the predefined redeemable document templates is associated with a respective redeemable document template identifier; and
rendering a representation of the redeemable document in the redeemable document management application by combining the predefined redeemable document template that is associated with the redeemable document template identifier with the redeemable document information.

2. The method of claim 1, wherein the metadata is a MIME type unique to redeemable documents.

3. The method of claim 1, further comprising:
upon determining that the content includes the redeemable document, rendering a notification on the primary computing device that the redeemable document was detected in the content.

4. The method of claim 3, further comprising:
sending a command to a redeemable document management application to render the redeemable document upon receiving an input to render the redeemable document.

5. The method of claim 1, further comprising:
transmitting the redeemable document to at least one secondary computing device associated with a user account of the primary computing device, wherein the secondary computing device is a mobile computing device.

6. The method of claim 5, further comprising:
requesting, from a server in network communication with the primary computing device, data identifying the at least one secondary computing device associated with the user profile of the primary computing device.

7. The method of claim 5, further comprising:
determining whether the at least one secondary computing device is capable of rendering the redeemable document, wherein the redeemable document is only transmitted to the at least one secondary computing device when the at least one secondary computing device is capable of rendering the redeemable document.

8. The method of claim 5, further comprising:
receiving an input identifying the at least one secondary computing device.

9. The method of claim 1, wherein the storing the retrieved redeemable document information in a database on the primary computing device includes storing a reference to network location wherein additional redeemable document information can be retrieved.

10. The method of claim 1, wherein the redeemable document information is retrieved from the network connected application.

11. The method of claim 1, wherein the redeemable document information can be updated by a source of the redeemable document.

12. The method of claim 1, presenting within the redeemable document management application an automatic update option.

13. The method of claim 1, presenting within the redeemable document management application a show on lock screen option, wherein the show on lock screen option comprises displaying at least a portion of the rendered representation of the redeemable document.

14. The method of claim 1, wherein the redeemable document management application presents multiple redeemable documents associated with the user to the user, and the redeemable document management application sorts the multiple redeemable documents based on location and time.

15. The method of claim 1, wherein the plurality of redeemable document templates include templates for at least two templates selected from: a boarding pass template, an event ticket template, a store card template, a coupon template, an ID card template, and a key card template.

16. The method of claim 1, wherein each of the plurality of redeemable document templates is associated with a different type of redeemable document, and each type of redeemable document having a different appearance.

17. The method of claim 1 comprising:
associating the redeemable document information with a user account; and
transmitting the redeemable document information associated with the user account to at least one secondary computing device also associated with the user account.

18. The method of claim 1, wherein the network connected application is an email application that includes email data, wherein the background process is configured to scan the email data to determine whether it contains a redeemable document.

19. A non-transitory computer-readable medium including instructions, that when executed by a computing device, cause the computing device to:
receive content through a network connected application running on a primary computing device;
determine, by a background process running on the primary computing device, that the content includes metadata, which includes an identifier that identifies a portion of the content as a redeemable document;
retrieve redeemable document information from the content and storing the retrieved redeemable document information in a database on the primary computing device, the redeemable document information including a redeemable document template identifier that identifies a predefined redeemable document template;
detect the redeemable document template identifier stored in the database on the primary computing device by a redeemable document management application, the redeemable document management application having access to a plurality of predefined redeemable document templates wherein each of the predefined redeemable document templates is associated with a respective redeemable document template identifier; and
render a representation of the redeemable document in the redeemable document management application by combining the predefined redeemable document template that is associated with the redeemable document template identifier with the redeemable document information.

20. The non-transitory computer-readable medium of claim 19, wherein the metadata is a MIME type unique to redeemable documents.

21. The non-transitory computer-readable medium of claim 19, wherein the instructions further cause the computing device to:
upon determining that the content includes the redeemable document, render a notification on the computing device that the redeemable document was detected in the content.

22. The non-transitory computer-readable medium of claim 21, wherein the instructions further cause the computing device to:
send a command to a redeemable document management application to render the redeemable document upon receiving an input to render the redeemable document.

23. The non-transitory computer-readable medium of claim 19, wherein the instructions further cause the computing device to:
transmit the redeemable document to at least one secondary computing device associated with a user account of the computing device, wherein the secondary computing device is a mobile computing device.

24. The non-transitory computer-readable medium of claim 23, wherein the instructions further cause the computing device to:
request, from a server in network communication with the computing device, data identifying the at least one secondary computing device associated with the user profile of the computing device.

25. The non-transitory computer-readable medium of claim 23, wherein the instructions further cause the computing device to:
determine whether the at least one secondary computing device is capable of rendering the redeemable document, wherein the redeemable document is only transmitted to the at least one secondary computing device when the at least one secondary computing device is capable of rendering the redeemable document.

26. The non-transitory computer-readable medium of claim 23, wherein the instructions further cause the computing device to:
   receive an input identifying the at least one secondary computing device.

27. A system comprising:
   a processor; and
   memory containing instruction that, when executed, cause the processor to: receive content through a network connected application running on a primary computing device;
   determine, by a background process running on the primary computing device, that the content includes metadata, which includes an identifier that identifies a portion of the content as a redeemable document;
   retrieve redeemable document information from the content and storing the retrieved redeemable document information in a database on the primary computing device, the redeemable document information including a redeemable document template identifier that identifies a predefined redeemable document template;
   detect the redeemable document template identifier stored in the database on the primary computing device by a redeemable document management application, the redeemable document management application having access to a plurality of predefined redeemable document templates wherein each of the predefined redeemable document templates is associated with a respective redeemable document template identifier; and
   render a representation of the redeemable document in the redeemable document management application by combining the predefined redeemable document template that is associated with the redeemable document template identifier with the redeemable document information.

28. The system of claim 27, wherein the metadata is a MIME type unique to redeemable documents.

29. The system of claim 27, wherein the instructions further cause the processor to:
   upon determining that the content includes the redeemable document, render a notification on the primary computing device that the redeemable document was detected in the content.

30. The system of claim 29, wherein the instructions further cause the processor to:
   send a command to a secondary application to render the redeemable document upon receiving an input to render the redeemable document.

31. The system of claim 27, wherein the instructions further cause the processor to:
   transmit the redeemable document to at least one secondary computing device associated with a user account of the primary computing device, wherein the secondary computing device is a mobile computing device.

32. The system of claim 31, wherein the instructions further cause the processor to:
   request, from a server in network communication with the primary computing device, data identifying the at least one secondary computing device associated with the user profile of the primary computing device.

33. The system of claim 31, wherein the instructions further cause the processor to:
   determine whether the at least one secondary computing device is capable of rendering the redeemable document, wherein the redeemable document is only transmitted to the at least one secondary computing device when the at least one secondary computing device is capable of rendering the redeemable document.

34. The system of claim 31, further comprising:
   receiving an input identifying the at least one secondary computing device.

* * * * *